US006304348B1

United States Patent
Watanabe

(10) Patent No.: US 6,304,348 B1
(45) Date of Patent: *Oct. 16, 2001

(54) OPTICAL COMMUNICATION METHOD AND OPTICAL COMMUNICATION SYSTEM BASED ON OPTICAL PHASE CONJUGATION

(75) Inventor: Shigeki Watanabe, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/003,753

(22) Filed: Jan. 7, 1998

Related U.S. Application Data

(63) Continuation-in-part of application No. 08/392,337, filed on Feb. 22, 1995, now abandoned.

(30) Foreign Application Priority Data

| Mar. 8, 1994 | (JP) | 6-37178 |
| Mar. 7, 1995 | (JP) | 7-47510 |

(51) Int. Cl.[7] .................. H04J 14/02; H04J 14/00; H04B 10/00; H04B 10/12
(52) U.S. Cl. .................. 359/124; 359/124; 359/127; 359/161; 359/173; 359/115
(58) Field of Search .................. 359/124, 160, 359/161, 174, 127

(56) References Cited

U.S. PATENT DOCUMENTS

| 5,062,155 | 10/1991 | Eda . | |
| 5,159,481 | 10/1992 | Maeda . | |
| 5,365,362 | * 11/1994 | Gnauck et al. | 359/174 |
| 5,400,165 | * 3/1995 | Gnauck et al. | 319/161 |
| 5,532,668 | 7/1996 | Fennell . | |
| 5,532,868 | 7/1996 | Gnauck et al. . | |
| 5,798,853 | * 8/1998 | Watanabe | 359/160 |

OTHER PUBLICATIONS

Kyo Inoue, Polarization Effect on Four Wave Mixing Efficiency in a Single–Model Fiber, 4/92 IEEE Journal of Quantum Electronics, vol. 28, No. 4, Apr. 1992, pp. 583–894.

Gnauck, 10 Gb/s 360–Km Transmission Over Dispersive Fiber Using Mirlsystem Spectral Inversive, IEEE Pholenics Tech. Letters, vol. 5, No. 6 Sunc 1993, pp. 663–666.

Jopson et al. Compensation of Fibre Chronmatic dispersive by Spectral Inversion, Electronic Letters 4/93, vol. 29, No. 7, pp. 576–596.

U.S. application No. 08/539,788, Shigeki Watanabe, filed Oct. 5, 1995.

* cited by examiner

Primary Examiner—Jason Chan
Assistant Examiner—M. R. Sedighian
(74) Attorney, Agent, or Firm—Staas & Halsey LLP

(57) ABSTRACT

An optical communication system comprising means for modulating a plurality of light carriers and then performing frequency division multiplexing on the modulated light carriers to generate a frequency division multiplexed light, a first single-mode fiber for transmitting the frequency division multiplexed signal light, means for generating a frequency division multiplexed signal light corresponding to a phase conjugate wave of the transmitted frequency division multiplexed signal light, and a second single-mode fiber for transmitting the frequency division multiplexed phase conjugate light. In the disclosed optical communication system, appropriate setting of parameters such as a mean light intensity of each fiber permits to eliminate an effect of channel-to-channel crosstalk.

18 Claims, 16 Drawing Sheets

OPTICAL COMMUNICATION METHOD AND OPTICAL COMMUNICATION SYSTEM BASED ON OPTICAL PHASE CONJUGATION

CROSS REFEREE TO RELATED APPLICATION

This application is a continuation-in-part of application Ser. No. 08/392,337, filed on Feb. 22, 1995, now abandoned.

BACKGROUND OF THE INVENTION

1. Field of the Invention

The present invention relates to an application of phase conjugate optics to optical communication and, more particularly, to an optical communication method and an optical communication system that use optical phase conjugation.

2. Description of the Related Art

Use of nonlinear optics provides new capabilities and improved characteristics not attainable by the conventional optical technologies. Especially, use of a phase conjugate light permits to compensate a phase fluctuation and a chromatic dispersion in a transmission path. A method of compensating a fiber chromatic dispersion and a method of compensating a high-speed optical pulse distortion by a nonlinear optical effect, both methods being based on the above-mentioned phase-conjugate light, are disclosed in Japanese Patent Application No. 5-221856. The present application is an extension of the above-mentioned patent application and applies optical phase conjugation to optical frequency division multiplexing (OFDM).

Conventional optical communication systems are constructed mainly by use of optical components having linear optical characteristics; therefore, the conventional systems are simple in construction but limited characteristics and functions. Especially, these days, a non-repeating system or an optical amplifier repeating system extending as long as several hundred to several thousand kilometers is being implemented. And a signal speed of such a system extends as high as several Gb/s to several tens of Gb/s. Further, to significantly increase a processing capacity of such a system, many researches are being made about higher-speed time division multiplexing (TDM) and OFDM in the electrical and optical processing stages and transmission methods based on these techniques. These systems have many problems to be solved. One of the most significant problems is the effect of fiber chromatic dispersion or group velocity dispersion (GVD). The GVD to be caused in an optical transmission path degrades transmission characteristics, which in turn limits transmission distances.

One of the conventional actions against the GVD is to minimize the dispersion of the optical fiber. For examples, already realized is an optical fiber in which the dispersion is substantially zero in 1.3 $\mu$m band and 1.5 $\mu$m band, which are practical transmission wavelength bands. Also, a research is being made into a system in which, to minimize a chirping (dynamic wavelength fluctuation), a laser diode is not modulated directly but a light emitted from the regularly-driven laser diode is externally modulated with an optical modulator. For an optical modulator having an excellent modulation characteristic, a LiNbO$_3$ Mach-Zehnder type optical modulator has been developed. Further, researches are being made into a method in which a signal light to be transmitted is provided with a chirping in advance to made compensation by the GVD in the transmission path and into a method in which the receiver side makes the dispersion compensation optically or electrically. Meanwhile, the possibility of applying phase conjugate optics to optical communication is described in "Compensation for channel dispersion by nonlinear optical phase conjugation", A. Yariv, D. Fekete, and D. M. Pepper, Opt. Lett., vol. 4, pp. 52–54, 1979.

As with the case of single-channel transmission, following factors limit the transmission speed and transmission distance in OFDM:

(a) the waveform distortion caused by the multiplied effect of GVD and optical Kerr effect;

(b) the influence of channel-to-channel crosstalk.

The crosstalk of (b) is mainly caused by the four-wave mixing (FWM) inside the optical fiber, the FWM occurrence efficiency being largely dependent on light intensity and phase matching. To be specific, use of a dispersion-shifted fiber (DSF) having a small GVD in order to avoid the problem of (a) above provides a condition in which it is easy to attain the FWM phase matching, thereby limiting a signal power of each channel, a channel-to-channel interval, and a transmittable distance. Namely, the transmission of a limited multiplexing density is performed with a limited S/N ratio.

On the other hand, use of a fiber having a relatively large dispersion value in order to suppress the FWM causes the problem of (a) to limit the signal speed of transmission and the transmittable distance. In either case, optical frequency division multiplexing (OFDM) can be implemented only in a fairly limited condition. It should be noted that the problem of (a) is solvable by applying phase conjugate optics as disclosed in the above-mentioned Japanese Patent Application No. 5-221856.

SUMMARY OF THE INVENTION

It is therefore an object of the present invention to provide an optical communication method and an optical communication system that preclude the effect of crosstalk between channels.

In order to apply the invention to a high speed system, the optical fiber in the following description is defined as a single mode fiber.

In carrying out the invention and according to one aspect thereof, there is provided an optical communication method comprising the steps of: generating an FDM signal light by modulating a plurality of light carriers as required and then performing frequency division multiplexing on the modulated light carriers; entering the resultant FDM signal light into a first end of a first single-mode fiber; generating an FDM phase conjugate light equivalent to a phase conjugate wave of the FDM signal light outputted from a second end of the first single-mode fiber; entering the FDM phase conjugate light into a first end of a second single-mode fiber; and demodulating the FDM phase conjugate light outputted from a second end of the second single-mode fiber; wherein a product of a mean light intensity, a nonlinear refractive index, and a length of the first single-mode fiber is substantially equal to a product of a mean light intensity, a nonlinear refractive index, and a length of the second single-mode fiber.

In carrying out the invention and according to another aspect thereof, there is provided an optical communication system comprising: an FDM signal light generator for generating an FDM signal light by modulating a plurality of light carriers as required and then performing frequency division multiplexing on the modulated light carriers; a first single-mode fiber having a first end and a second end, the first end being connected to the FDM signal light generator, the FDM signal light entered at the first end being transmitted to the second end to be outputted; a phase conjugate light generator having an input end and an output end, the input end being connected to the second end of the first single-mode fiber to generate an FDM phase conjugate light equivalent to a phase conjugate wave of the FDM signal light entered at the input end; and a second single-mode fiber having a first end and a second end, the first end being connected to the output end of the phase conjugate light generator, the FDM phase conjugate light entered at the first end being transmitted to the second end to be outputted; wherein a product of a mean light intensity, a nonlinear refractive index, and a length of the first single-mode fiber is substantially equal to a product of a mean light intensity, a nonlinear refractive index, and a length of the second single-mode fiber.

The optical communication method or the optical communication system according to the invention generates the FDM phase conjugate light equivalent to the phase conjugate wave of the FDM signal light between the first and second single-mode fibers and sets the parameters including the mean light intensity in each single-mode fiber to a predetermined relationship, thereby excluding the influence of channel-to-channel crosstalk based on an operational principle to be described.

The above and other objects, features and advantages of the present invention and the manner of realizing them will become more apparent and the invention itself will best be understood from a study of the following description and appended claims with reference to the attached drawings showing some preferred embodiments of the invention.

DESCRIPTION OF THE EMBODIMENTS

This invention will be described in further detail by way of example with reference to the accompanying drawings.

Figure 1:
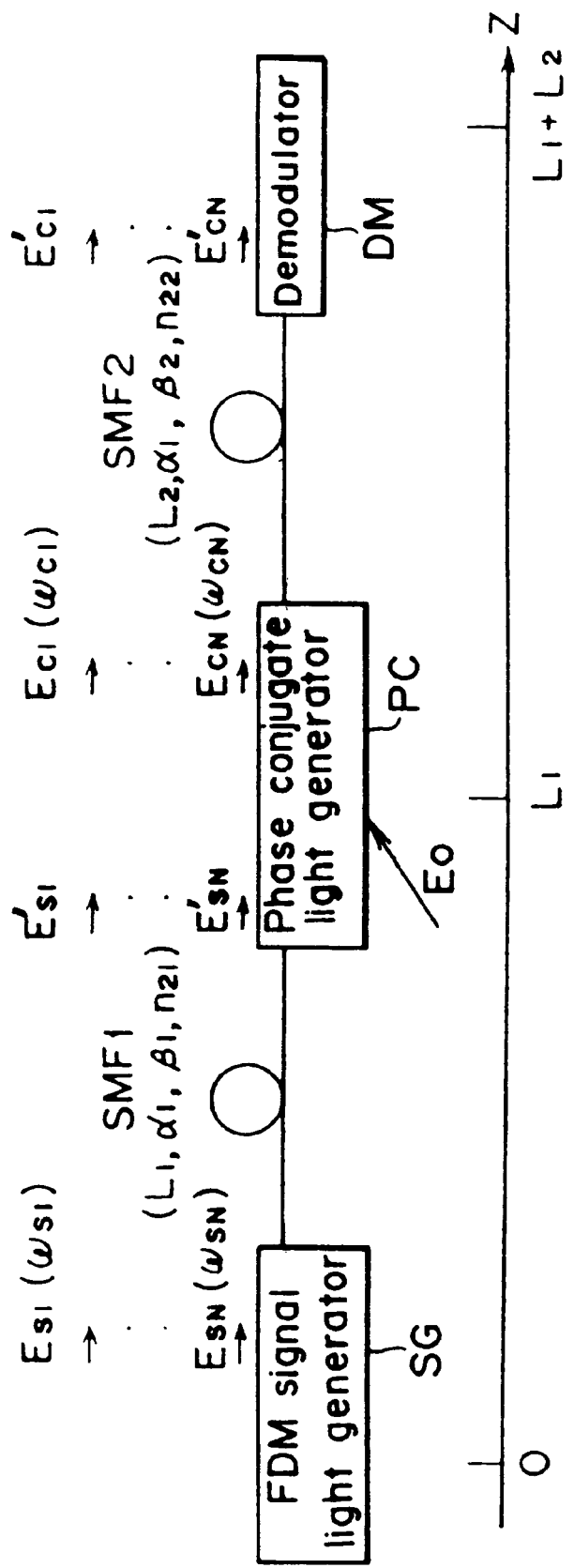
FIG. 1 is a schematic diagram illustrating a basic constitution of the system according to the invention.

Now, referring to FIG. 1, there is shown a block diagram illustrating a basic constitution of an optical communication system according to the invention. An FDM signal light generator SG modulates light carriers of N channels of frequencies $\omega_{S1}, \omega_{S2}, \ldots, \omega_{SN}$ as required and performs frequency division multiplexing on the modulated light carriers to generate FDM signal lights. Frequency components of the FDM signal lights are $E_{S1}, E_{S2}, \ldots, E_{SN}$. The FDM signal lights are transmitted to a phase conjugate light generator PC through a first single-mode fiber SMF1 having a length $L_1$, a loss constant $\alpha_1$, a transmission constant $\beta_1$, and a nonlinear refractive index $n_{21}$. Modulating of the FDM signal light generator SG is intensity (amplitude) modulation or angular modulation.

The phase conjugate light generator PC comprises, for example, a nonlinear optical medium, a pumping source for generating a pump light $E_0$, and an optical system for supplying the pump light $E_0$ and the FDM signal light to the nonlinear optical medium. A particular constitution of the phase conjugate light generator PC will be described later. The FDM signal lights $E_{S1}, \ldots, E_{SN}$ sent from the FDM signal light generator SG change to $E_{S1}', \ldots, E_{SN}'$ respectively while passing the single-mode fiber SMF1. Then, the signal lights $E_{S1}', \ldots, E_{SN}'$ are converted to FDM phase conjugate lights $E_{C1}, \ldots, E_{CN}$ corresponding to the phase conjugate waves of the FDM signal lights. Frequencies of the frequency components of the FDM phase conjugate lights are $\omega_{C1}, \ldots, \omega_{CN}$.

Then, the FDM phase conjugate lights are transmitted to a demodulator DM through a second single-mode fiber SMF2 having a length $L_2$, a loss constant $\alpha_2$, a transmission constant $\beta_2$, and a nonlinear refractive index $n_{22}$. The FDM phase conjugate lights $E_{C1}, \ldots, E_{CN}$ change to $E_{C1}', \ldots, E_{CN}'$ through the second single-mode fiber SMF2 respectively. The demodulator DM demodulates the received FDM phase conjugate lights to reproduce demodulated signals corresponding to the signals modulated by the FDM signal light generator SG. Suitable wave detecting in the demodulation is direct detecting using a photo diode or the like receiving optics if modulating is intensity modulation; if modulating is amplitude or angular modulation, heterodyne wave detecting or homodyne wave detecting using a local light is suitable.

The influence of GVD of each channel can be compensated for if a following condition is satisfied as described in the above-mentioned Japanese Patent Application No. 5-221856:

$$\frac{\partial^2 \beta_1(\omega_{Si})}{\partial \omega^2} L_1 = \frac{\partial^2 \beta_2(\omega_{Ci})}{\partial \omega^2} L_2 \quad (i = 1, 2, \cdots, N) \tag{1}$$

where, $\partial^2 \beta_j/\partial \omega^2$ (j=1, 2) represents a GVD in the fiber. Therefore, the above-mentioned equation (1) can be satisfied to effect the compensation of dispersion by making substantially equal the lengths of the single-mode fibers SMF1 and SMF2 that have a same dispersion. If the fibers have different dispersions, the above-mentioned can be satisfied by varying the lengths of the fibers. In this case, the signs of the GVD of the two fibers must be the same.

If an influence of optical Kerr effect is not negligible, the compensation is made as follows. In this case, a pulse shape is distorted by both GVD and optical Kerr effect. For a simplest approximation, it is considered that each effect is compensated independently. In this case, the compensation of GVD is made in the same manner as mentioned above. The influence of optical Kerr effect can be compensated if the following condition is satisfied:

$$\omega_S n_{21} \overline{P_{Si}} L_1 = \omega_C n_{22} \overline{P_{Ci}} L_2 \tag{2}$$

where, $P_{si}$ represents a mean power of a signal light of channel i in the first single-mode fiber SMF1, while $P_{ci}$ represents a mean power of a phase conjugate light of channel i in the second single-mode fiber SMF2. That is:

$$\overline{P_{Si}} = \frac{1 - \exp(-\alpha_1 L_1)}{\alpha_1 L_1} P_{Si}(0) \tag{3}$$

$$\overline{P_{Ci}} = \frac{1 - \exp(-\alpha_2 L_2)}{\alpha_2 L_2} P_{Ci}(L_1) \tag{4}$$

Thus, presetting the products of nonlinear refractive index, mean power, fiber length substantially equally to the first and second single-mode fibers permits the pulse compensation by optical Kerr effect. Actually, since a pulse distortion is caused by effect of GVD and optical Kerr effect, the pulse distortion cannot be completely compensated by compensating the GVD and the optical Kerr effect independently. And, because a chirping amount differs between pulse shapes, the approximation by mean power as mentioned above can be attained only in a limited condition (for example, a condition where a power fluctuation is small).

In order to strictly compensate the pulse distortion caused by effect of the GVD and the optical Kerr effect, it is useful to adopt a numerical analysis of wave equation. In general, if the power distributions of the first and second single mode fibers are substantially symmetrical to each other, it becomes to possible to receive the signal light compensated in the pulse distortion caused by effect of the chromatic dispersion and the optical Kerr effect and the crosstalk caused by FWM (four light-wave mixing).

Figure 2:
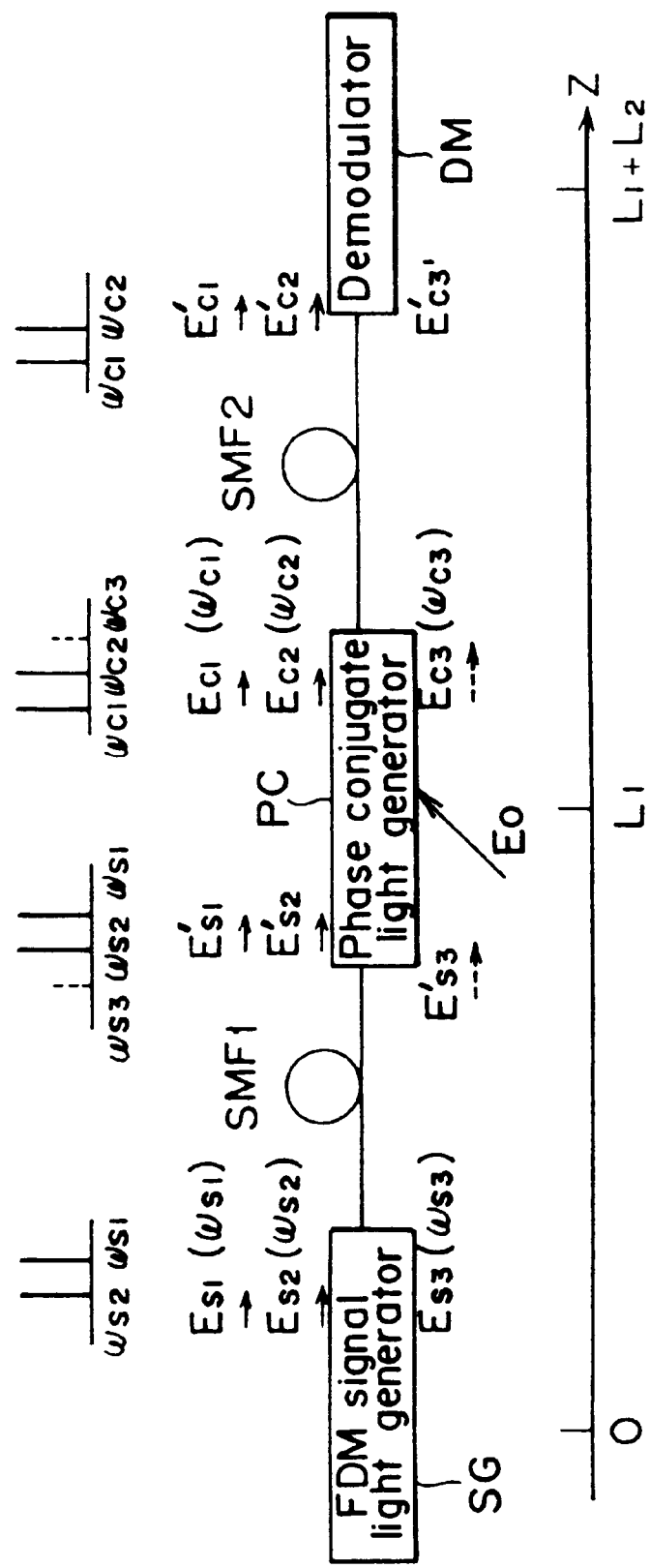
FIG 2 is a schematic diagram illustrating a principle of crosstalk compensation.

Next, the compensation of the crosstalk caused by FWM will be described. To explain the principle of this compensation, OFDM of three channels is taken as a simplest model as shown in FIG. 2. In this example, two channels are transmitted. It is supposed that FWM with a light of one of the channels, for example, a light of the second channel being a pump light occurs selectively. This is equivalent to a transmission that uses DSF as single-mode fibers SMF1 and SMF2 in which $\omega_{S2}$ and $\omega_{C2}$ are zero-dispersion wavelengths, respectively. If the light of the first channel converted by FWM is the third channel, lights of the first and third channels after transmission of the single-mode fiber SMF1 are given as follows:

$$E_{S1}' = \exp(-\alpha_1 L_1/2)\exp(ir_1)[(1+ir_1)E_{S1} + ir_1 E_{S3}^*] \tag{5}$$

$$E_{S3}' = \exp(-\alpha_1 L_1/2)\exp(ir_1)[ir_1 E_{S1}^* + (1+ir_1)E_{S3}] \tag{6}$$

where, $$r_1 = \kappa_1 |E_{S2}|^2 l_1(L_1) = \kappa_1 \overline{|E_{S2}|^2} L_1 \tag{7}$$

$$\kappa_1 = \frac{3\omega_{s2}}{2n_1 c} \chi_1^{(3)} \tag{8}$$

$n_2$ and $\chi_1^{(3)}$ represent a core refractive index and a third-order receptibility of the single-mode fiber SMF1 respectively. $l_1(L_1)$ represents an interaction length and is given as follows:

$$l_1(L_1) = \frac{1 - \exp(-\alpha_1 L_1)}{\alpha_1} \tag{9}$$

Especially, if the light of the third channel is not initially entered ($E_{S3}$=0), equations (5) and (6) become as follows:

$$E_{S1}' = \exp(-\alpha_1 L_1/2)\exp(ir_1)(1+ir_1)E_{S1} \tag{10}$$

$$E_{S3}' = \exp(-\alpha_1 L_1/2)\exp(ir_1)(ir_1)E_{S1}^* \tag{11}$$

Then, these lights are converted by the phase conjugate light generator PC into phase conjugate lights ($E_{C1}$, $E_{C2}$, $E_{C3}$). Let a gain of the phase conjugate light generator be g, then, the following equations are given:

$$E_{C1} = \exp(-\alpha_1 L_1/2 + g)\exp(-ir_1)(1-ir_1)E_{S1} \tag{12}$$

$$E_{C3} = \exp(-\alpha_1 L_1/2 + g)\exp(-ir_1)(-ir_1)E_{S1} \tag{13}$$

Then, these lights are entered in the single-mode fiber SMF2. In the single-mode fiber SMF2, the energy conversion by FWM also occurs. If an ideal phase matching has been established as with the above-mentioned case, the light of the third channel after the transmission of the single-mode fiber SMF2 is given as follows:

$$\exp[-(\alpha_2 L_2 + \alpha_1 L_1)/2 + g]\exp(ir_2)[ir_2 E_{C1}^* + (1+ir_2)E_{C3}] \tag{14}$$

where, $$r_2 = \kappa_2 |E_{C2}|^2 l_2(L_2) \tag{15}$$

$$\kappa_2 = \frac{3\omega_{c2}}{2n_2 c} \chi_2^{(3)} \tag{16}$$

$n_2$ and $\chi_2^{(3)}$ represent a core refractive index and third-order receptibility of the single-mode fiber SMF2 respectively. $l_2(L_2)$ represents an interaction length and is given as follows:

$$l_2(L_2) = \frac{1 - \exp(-\alpha_2 L_2)}{\alpha_2} \tag{17}$$

When the equations (12) and (13) are substituted into the equation (14), the following equation is obtained:

$$E_{C3}' = \exp[-(\alpha_2 L_2 + \alpha_1 L_1)/2 + g]A(r_1, r_2)E_{S1} \tag{18}$$

where, $$A(r_1, r_2) = \exp[-i(r_1 r_2)](-ir_1)(1+ir_2) + \exp[i(r_1+r_2)](ir_2)(1+ir_1) \quad (19)$$

On the other hand, if the single-mode fibers SMF1 and SMF2 are transmitted without using the phase conjugate light generator PC (provided however that the gain g is linearly amplified only once midway to transmission loss compensation), a light $E_{c3}''$ of the third channel to be output from the single-mode fiber SMF2 is given as follows:

$$E_{c3}'' = \exp[-(\alpha_2 L_2 + \alpha_1 L_1)/2 + g]B(r_1, r_2)E_{S1}^* \quad (20)$$

where, $$B(r_1, r_2) = \exp[i(r_1 + r_2)](ir_1)(1+ir_2) + \exp[-i(r_1 - r_2)](ir_2)(1-ir_1) \quad (21)$$

A region in which FWM can be effectively suppressed by the phase conjugate light generator PC is a region where $r < 0.17\pi$. For example, if a single-mode fiber is used for a nonlinear optical medium, an optical power with $r=0.17\pi$ is about +12 dBm at 20 km and about +10 dBm at 40 km. These values are sufficiently applicable in an ordinary FDM system. From the equations (18) through (21), a suppression ratio $S(r_1, r_2)$ of FWM with the phase conjugate light generator PC used is given as follows:

$$S(r_1, r_2) = \frac{|E'_{C3}|^2}{|E''_{C3}|^2} = \frac{|A(r_1, r_2)|^2}{|B(r_1, r_2)|^2} \quad (22)$$

Especially, when $r_1 = r_2 = r$, the suppression ratio is given as follows:

$$S(r) = \frac{1 - \cos 2r}{1 + p\cos 2r + q\sin 2r} \text{ where,} \quad (23)$$

$$p = \frac{1-r^2}{1+r^2} \quad q = -\frac{2r}{1+r^2} \quad (24)$$

If the loss is set to 0.23 dB/km and the input power of the second channel is set to 3.16 mW (+5 dBm) in the ordinary DSF, the suppression ratios S(r) for transmission distances may be estimated as listed in Table 1.

TABLE 1

Suppression ratio vs. Transmission distance

| L (km) | S (r) |
|---|---|
| 20 | 0.005 (−22.8 dB) |
| 40 | 0.014 (−18.7 dB) |
| 60 | 0.021 (−16.9 dB) |
| 100 | 0.029 (−15.4 dB) |
| 200 | 0.034 (−14.7 dB) |

The above-mentioned discussion under the condition of ideal phase matching is applicable to the case in which the phase conditions of the first and second single mode fibers are symmetrical. In this case, the limitations of compensation depend on the asymmetry of the optical power distribution caused by transmission loss. Optimum compensation under a certain condition may become possible by using a numerical analysis of wave equation in a strict sense.

Figure 3:
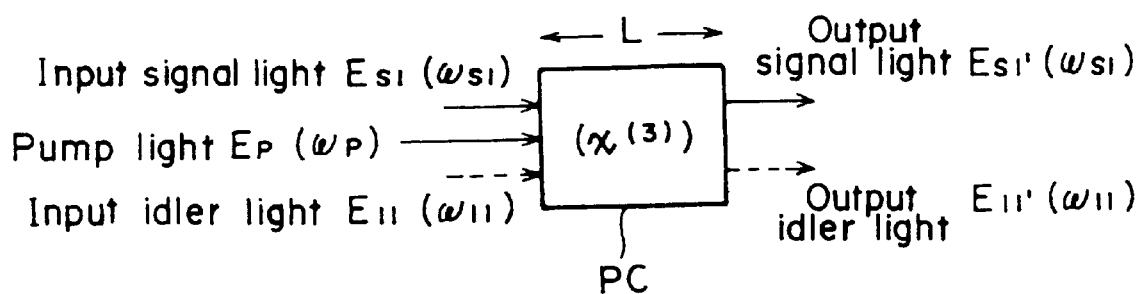
FIG. 3 is a schematic diagram illustrating an operational principle of the phase conjugate light generator.

Now, referring to FIG. 3, there is shown a diagram illustrating principles of operation of the phase conjugate light generator PC. It is desirable for generation of the phase conjugate light to use four-wave mixing, more particularly, forward four-wave mixing (FFWM) in which a signal light and a pump light propagate in a same direction in a nonlinear optical medium. As shown in FIG. 3, in FFWM, a third-order nonlinear optical process caused by a pump light $E_P$ (frequency $\omega_P$) of a high intensity or, more particularly, a self diffraction effect of a pump light caused by a matter excitation wave formed by interaction of the signal light and other pump lights generates FDM signal lights $E_{S1}', \ldots, E_{SN}'$ of frequencies $(\omega_{S1}, \ldots, \omega_{SN}$ and wave numbers $k_{S1}, \ldots, k_{SN}$ and FDM idler lights $E_{I1}', \ldots, E_{IN}'$ of frequencies $\omega_{I1}, \ldots, \omega_{IN}$ and wave numbers $k_{I1}, \ldots, k_{IN}$ from FDM signal lights $E_{S1}, \ldots, E_{SN}$ of frequencies $\omega_{S1}, \ldots, \omega_{SN}$ and wave numbers $k_{S1}, \ldots, k_{SN}$. The pump light $E_P$ corresponds to the pump light $E_0$ of FIG. 1 and FIG. 2 and the FDM idler light (output idler light) corresponds to the FDM phase conjugate light. Especially, as shown in FIG. 3, when supplying the pump light Eto the nonlinear optical medium in the same direction as the signal light, $k_{Ii} = 2k_P - k_{Si}$ (i=1, ..., N), therefore, the idler light is outputted in the same direction as the incidence.

At this time, owing to the law of conservation of energy, the following relation is established:

$$\omega_{Si} + \omega_{Ii} = 2\omega_P (i=1, \ldots, N) \quad (25)$$

Figure 4:
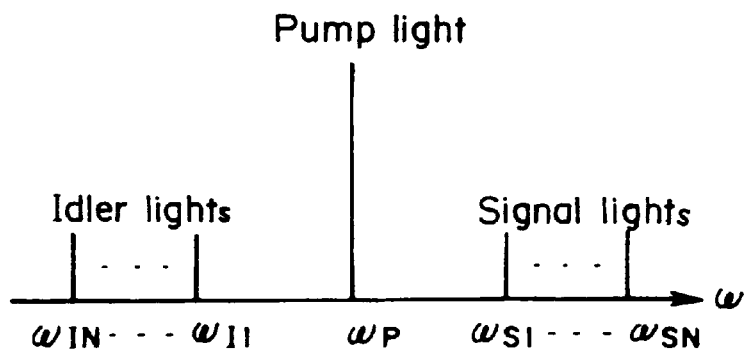
FIG. 4 is a diagram illustrating a frequency disposition of a signal light, a pump light, and an idler light.

Allocations of the signal lights (FDM signal lights), the pump light, and the idler lights (FDM phase conjugate lights) at this moment are as shown in FIG. 4. As is clear from the equation (25), spectra are inverted by FFWM. Consequently, if each signal light has been modulated, a Fourier component having a frequency of $\omega_{Si} + \Omega$ is converted to a component having a frequency of $\omega_{Ii} + \Omega$.

Let the interactive length of the nonlinear optical effect of the principle of FIG. 1 be L, then the following generating equations are given:

$$E_{Ii}' = \exp(igL)[(1+igL)E_{Ii} + igL \, E_{Si}^*] \quad (26)$$

$$E_{Si}'^* = \exp(-igL)[-igLE_{Ii} + (1-igL)E_{Si}^*] \quad (27)$$

where, $$g = \kappa |E_P|^2 \quad (28)$$

$$\kappa = \frac{3\omega_P}{2nc} \chi^{(3)} \quad (29)$$

n and $\chi_2^{(3)}$ are refractive index and a third-order nonlinear constant of the nonlinear medium (it is assumed that there is no loss) respectively. It is also assumed that a phase matching has been established ($|\sigma k| = |12 k_P - k_S - k_1| = 0$) in this case. In the equation of (26), if there is no input idler light ($E_{Ii} = 0$), it is apparent that the output idler light is the phase conjugate light of the input signal light. Gains $G_S$ and $S_I$ for the signal light and the idler light respectively are given as follows:

$$G_{Si} = G = 1 = (gL)^2 \quad (30)$$

$$G_{Ii} = (G-1) = (gL)^2 \quad (31)$$

Use of a pump light having a sufficiently large power allows the phase conjugate light generator PC to implement signal amplification (optical parametric amplification) at the same time.

Figure 5:
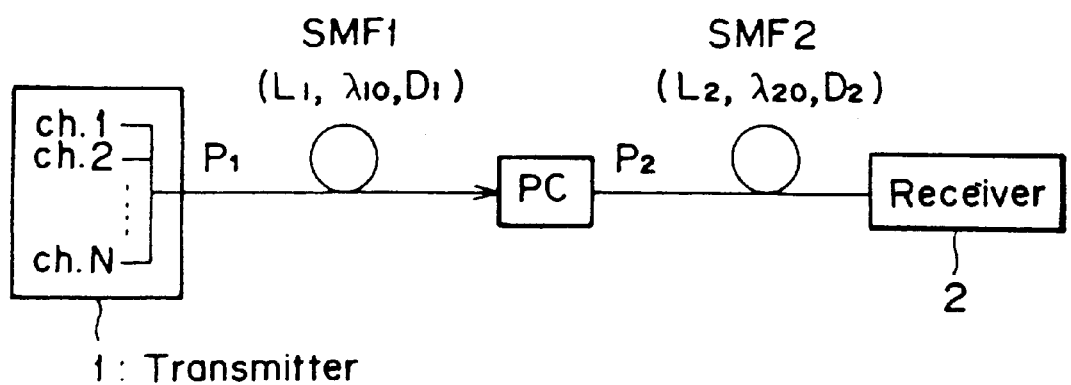
FIG. 5 is a block diagram illustrating the optical communication system practiced as a first embodiment of the invention.

Now, referring to FIG. 5, there is shown a block diagram of the optical communication system practiced as one preferred embodiment of the present invention. This embodiment uses a transmitter 1 and a receiver 2 corresponding to the FDM signal light generator SG and the modulator DM of FIG. 1 respectively. The transmitter 1 generates FDM signal lights of N channels. The generated FDM signal lights are transmitted to a phase conjugate light generator PC through a single-mode fiber SMF1 having a length $L_1$, a zero dispersion wavelength $\lambda_{10}$, and a dispersion $D_1$. The transmitted FDM signal lights are then converted by the phase conjugate light generator PC into FDM phase conjugate lights of N channels. The FDM phase conjugate lights are then transmitted to the receiver 2 through a single-mode fiber having a length $L_2$, a zero dispersion wavelength $\lambda_{20}$, and a dispersion $D_2$. The receiver 2 detects the signal of each channel. For the amplitude-modulated (intensity-modulated) FDM signal lights for example, the receiver 2 performs direct detection after channel extraction by filter or envelope detection based on optical heterodyne method. If the transmitter 1 uses frequency (phase) modulation, the receiver 2 performs direction detection after converting the signals to intensity-modulated signals by an optical filter or the like or performs phase detection based on optical heterodyne wave detection.

In the above-mentioned embodiment, if the single-mode fibers SMF1 and SMF2 are large in GVD as in the case where light signals in 1.5 μm band are transmitted through 1.3 μm zero-dispersion fibers, the effect of GVD is compensated based on the above-mentioned principle along the influence of the optical Kerr effect. On the other hand, if the wavelength band of signal lights is near the zero-dispersion wavelengths of the single-mode fibers SMF1 and SMF2, the effect of crosstalk owing to FWM is suppressible based on the above-mentioned principle. As with the case where a degree of phase matching depends on a magnitude of chromatic dispersion, a different FWM generating efficiency will result. In such a case, if the phase matching conditions of the first and second single mode fibers are symmetrical, the crosstalk caused by FWM can be suppressed. For example, in case of DSF used as a transmission line, setting a dispersion value or zero-dispersion wave length of the DSF to appropriate values provides an ideal suppression of the crosstalk.

Figure 6:
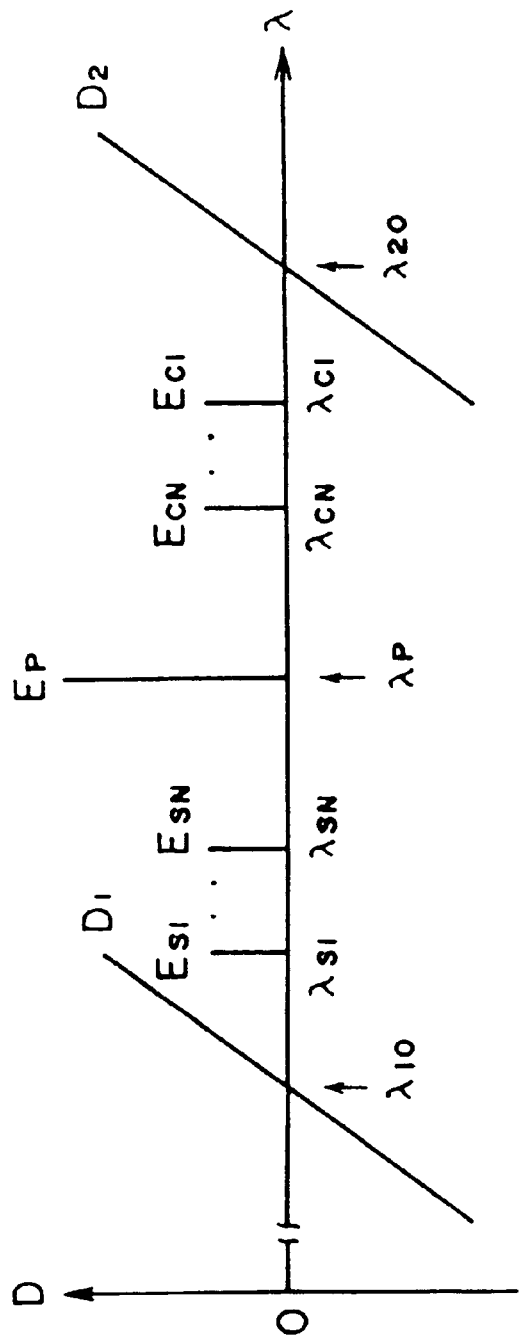
FIG. 6 is a diagram illustrating an example of wavelength disposition.

FIG. 6 shows the allocation of the above-mentioned wavelengths for example. FIG. 6 further shows that the variation of the dispersion is linear to the variation of the wave length in the vicinity of the zero-dispersion wave length. In this example, a relative relationship between the wavelength positions $(\lambda_{S1}, \ldots, \lambda_{SN})$ of each light carrier in the FDM signal lights and the zero-dispersion wavelength $\lambda_{10}$ of the first single-mode fiber SMF1 is made generally symmetrical with a relative relationship between the wavelength positions $(\lambda_{CN}, \ldots, \lambda_{C1})$ of each optical carrier in the FDM phase conjugate lights and the zero-dispersion wavelength $\lambda_{20}$ of the second single-mode fiber SMF2. In this case, the lengths $(L_1, L_2)$ of the single-mode fibers SMF1 and SMF2 are set to generally a same value and the input powers $(P_1, P_2)$ to the fibers are set to generally a same value. This allows to realize $D_1$ and $D_2$ having different signs and substantially same absolute values (thus, symmetrical phase matching), thereby providing a good suppressing of the crosstalk.

Meanwhile, compensation for the GVD by means of the phase conjugate light generator requires to make equal the total dispersion amounts of the single-mode fibers SMF1 and SMF2 and with the same sign. In the example of the GVD of FIG. 6, the sign of the dispersion is inverted before and after the phase conjugate light generator PC, so that the above-mentioned condition is not established. However, the occurrence of FWM in the optical fiber used as a transmission path presents a problem only in a region with a sufficiently small GVD, so that, generally, the effect of the GVD on the waveform distortion is small enough not to present the problem. Consequently, in such a case, the suppression of crosstalk may only be considered by ignoring the effect of GVD. However, in a repeated transmission using an optical amplifier, the waveform distortion cannot be ignored, so that the above-mentioned method cannot be applied as it is.

Figure 7:
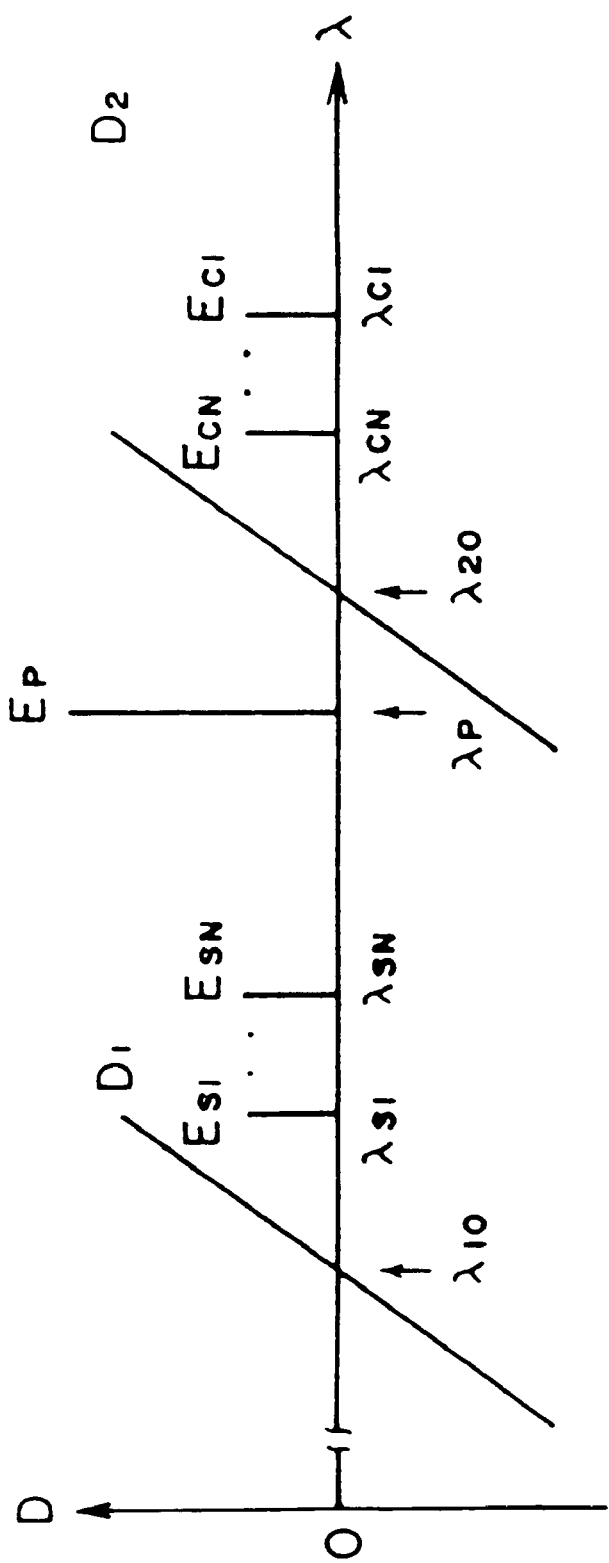
FIG. 7 is a diagram illustrating another example of wavelength disposition.

The GVD suitable for the above-mentioned case is shown in FIG. 7 by way of example. In this example, the allocation of the wavelength positions $(\lambda_{S1}, \ldots, \lambda_{SN})$ of each carrier in the FDM signal lights observed from the zero dispersion wavelength $\lambda_{10}$ of the single-mode fiber SMF1 is generally matched with the allocation of the wavelength positions $(\lambda_{CN}, \ldots, \lambda_{C1})$ of each carrier in the FDM signal lights observed from the zero dispersion wavelength $\lambda_{20}$ of the single-mode fiber SMF2. In this example, because the channel disposition is inverted by the phase conjugate light generator PC, the dispersion and crosstalk cannot be completely compensated over the entire channels. However, the compensation may be sufficient practically. Namely, because the dispersion compensation and the crosstalk compensation are in a trade-off relationship, the entire channels are compensated substantially completely by weighting each of the channels. For example, a channel relatively better in dispersion compensation is made to carry a signal that is affected by the dispersion relatively easily (for example, a signal of a relatively higher speed); alternatively, a channel better in crosstalk compensation is decreased in signal power while increasing it for other channels.

Figure 20A:
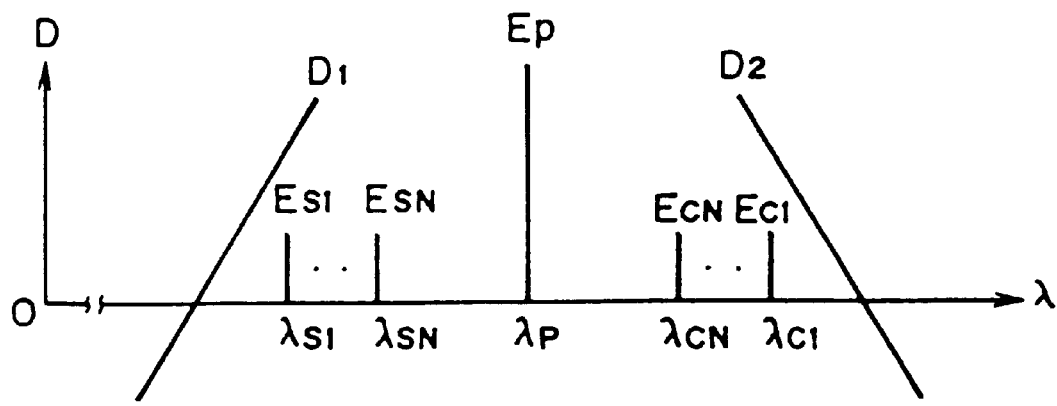
FIGS. 20A and 20B are diagrams illustrating examples of dispersion characteristics of fibers.
Figure 20B:
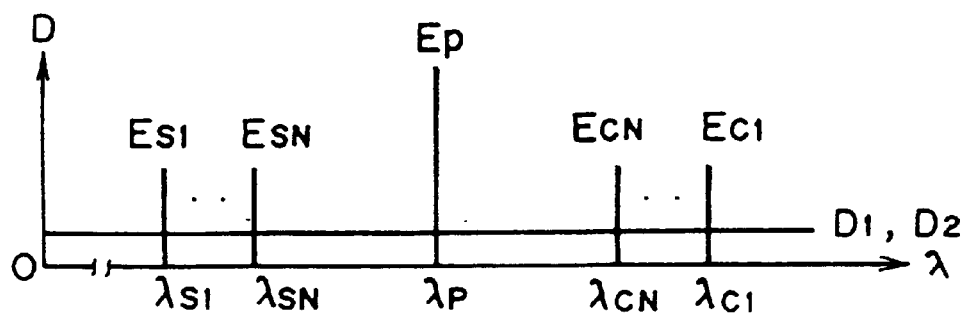

By adopting the special design of dispersion characteristics shown in FIGS. 20A and 20B, the waveform distortion caused by dispersion and the crosstalk caused by FWM can be completely compensated over the entire channels. The design shown in FIG. 20A includes the first and second single mode fibers having different signs of second-order dispersion (inclination of dispersion). This allows to realize completely symmetrical dispersions having different signs (thus, symmetrical phase matching), so that the waveform distortion and crosstalk can be compensated over the entire channels. The design shown in FIG. 20B includes the fibers in which second-order dispersions are zero. In this case, by using the fibers having relatively great and constant values of dispersion, the waveform distortion and crosstalk can be compensated over the entire channels. These fibers can be obtained by specific design of fiber parameters (for example, core diameters, refractive indices) and selection of fiber materials.

Figure 8:
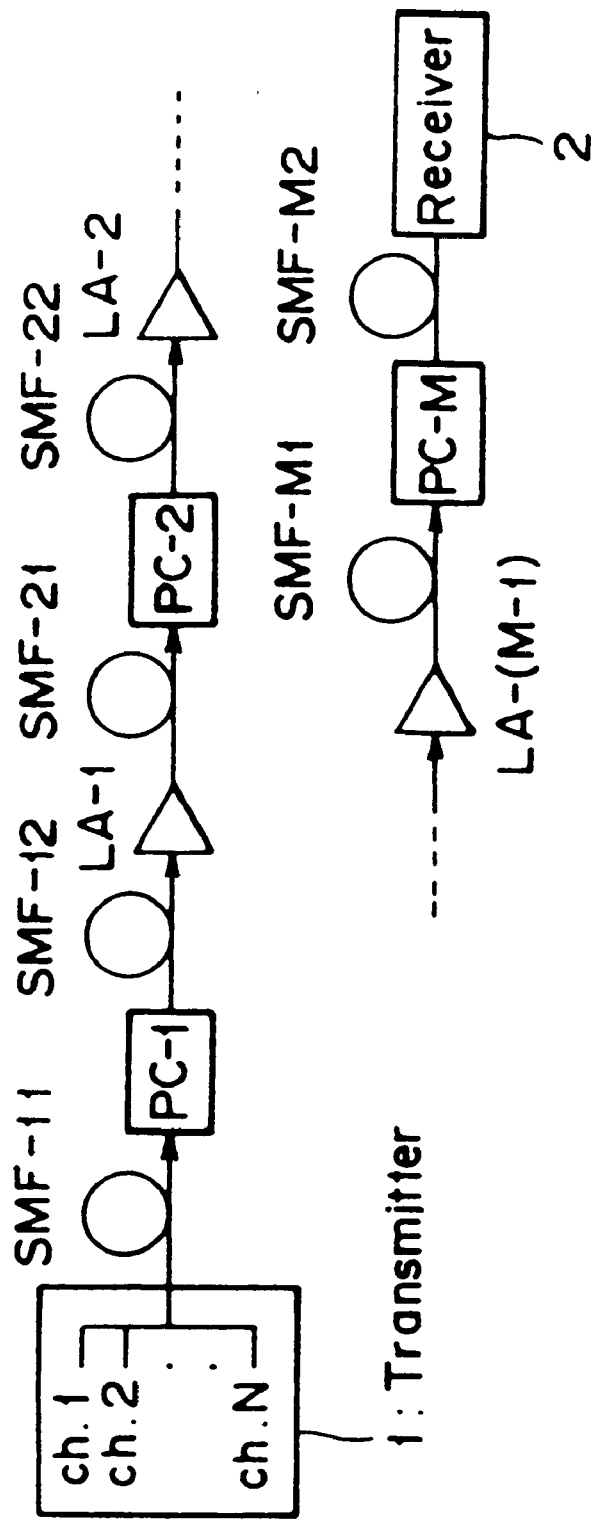
FIG. 8 is a block diagram illustrating the optical communication system practiced as a second embodiment of the invention.

Now, referring to FIG. 8, there is shown a block diagram illustrating the optical communication system practiced as a second preferred embodiment of the invention. As shown, a plurality of groups of optical paths are connected in series between a transmitter 1 and a receiver 2. An optical path of a first group is composed of a single-mode fiber SMF-11, a phase conjugate light generator PC-1, and a single-mode fiber SMF-12 corresponding to the single-mode fiber SMF1, the phase conjugate light generator PC, and the single-mode fiber SMF2 of FIG. 5 respectively. Optical paths of a second and subsequent groups are composed in the same manner as the first group. In this example, there are M groups of optical paths (M being a natural number of 2 or higher) and a linear light amplifier LA-k (k=1, 2, . . . , (M−1)) between the optical paths.

To be more specific, transmission is performed while the pulse distortion or crosstalk in single-mode fibers SMF-k1 and SMF-k2 before and after a kth phase conjugate light generator PC-k is compensated by it. The principle of the compensation by each phase conjugate light generator PC-k is the same as that mentioned earlier. Also, the allocation of each wavelength in the crosstalk compensation is the same as that mentioned earlier. In the present example, one linear optical amplifier is provided between the optical paths. The number of linear optical amplifiers may be increased as required.

Figure 9:
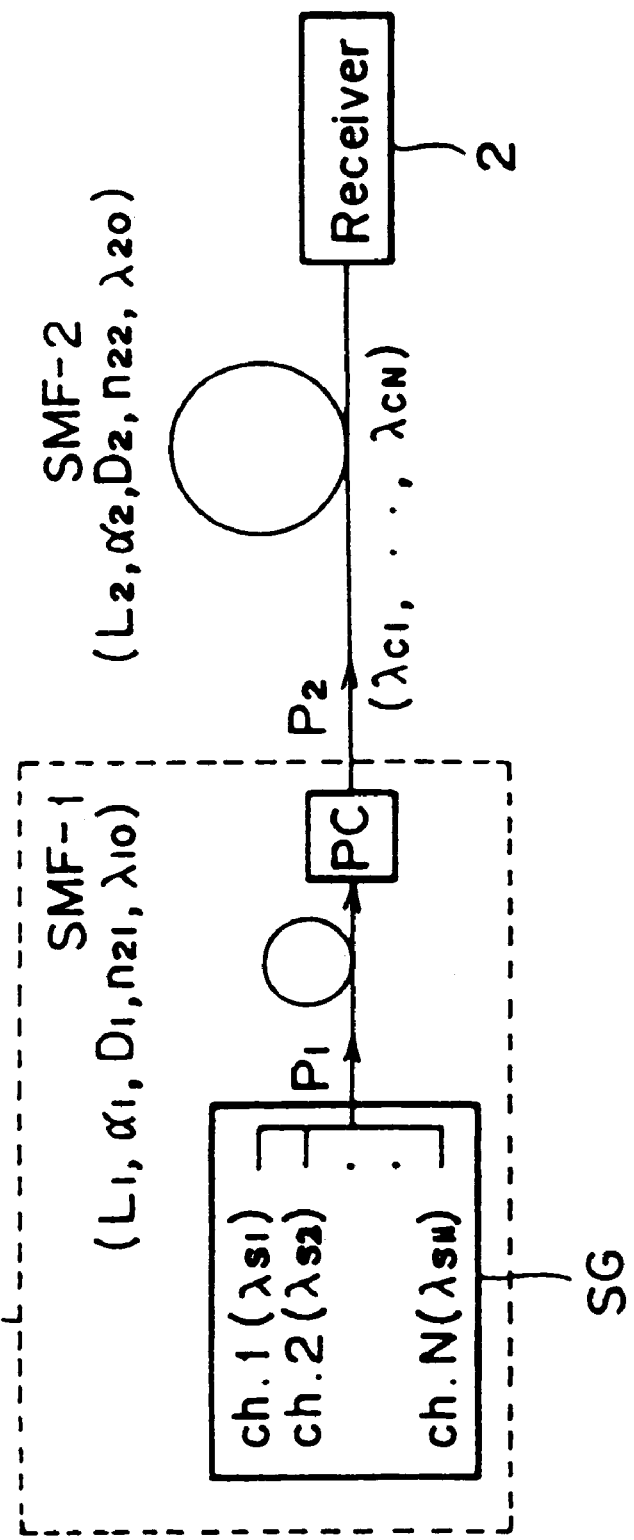
FIG. 9 is a block diagram illustrating the optical communication system practiced as a third embodiment of the invention.

Referring to FIG. 9, there is shown a block diagram illustrating the optical communication system practiced as a third preferred embodiment of the invention. In this example, a transmitter 11 contains an FDM signal light generator SG, a first single-mode fiber SMF-1 (having a length $L_1$, a loss $\alpha_1$, a dispersion $D_1$, a nonlinear refractive index $n_{21}$, and a zero-dispersion wavelength $\lambda_{10}$), and a phase conjugate light generator PC. An FDM signal light is entered in the single-mode fiber SMF-1 at a power $P_1$. The FDM signal light is converted by the phase conjugate light generator PC into an FDM phase conjugate light. The FDM phase conjugate light is transmitted to a receiver 2 through a second single-mode fiber SMF-2 (having a length $L_2$, a loss $\alpha_2$, a dispersion $D_2$, a nonlinear refractive index $n_{22}$, and a zero-dispersion wavelength $\lambda_{20}$). First, a nonlinear pulse distortion caused by the single-mode fiber SMF-2 as a transmission path is compensated by setting dispersion and nonlinear refractive index values so that the following conditions are satisfied:

$$\lambda_s^2 D_1 L_1 = \lambda_c^2 D_2 L_2 \tag{32}$$

$$\frac{n_{21}}{\lambda_s}\overline{P_1}L_1 = \frac{n_{22}}{\lambda_c}\overline{P_2}L_2 \tag{33}$$

where, $P_1$ and $P_2$ represent mean powers in the fibers SMF-1 and SMF-2 respectively.

The equation (32) represents a compensation condition for GVD, while the equation (33) represents a compensation condition for optical Kerr effect. According to the present embodiment, an undistorted pulse can be received by the receiver 2 and, because the phase conjugate light generator PC is not located in the transmission path, the polarization dependency in the transmission path need not be considered. It is desirable that the dispersion $D_1$ and the nonlinear refractive index $n_{21}$ of the first single-mode fiber SMF-1 be set relatively large values. This permits a long distance transmission by using the relatively long second single-mode fiber SMF-2. On the other hand, the crosstalk owing to FDM is compensated so that the following condition is satisfied if the perfect phase matching is achieved:

$$\kappa_1 P_1 1_1(L_1) = \kappa_2 P_2 1_1(L_1) \tag{34}$$

Namely, by making a product of the input light intensity, nonlinear refractive index, and interaction length in the first single-mode fiber SMF-1 generally equal to a product of the input light intensity, nonlinear refractive index, and interaction length in the second single-mode fiber SMF-2, the crosstalk owing to FWM can be compensated. With the equation (7) taken into account, the equation (34) can be modified as follows:

$$\kappa_1 \overline{P_1} L_1 = \kappa_2 \overline{P_2} L_1 \tag{35}$$

Namely, by making a product of the mean light intensity, nonlinear refractive index, and fiber length in the first single-mode fiber SMF-1 generally equal to a product of the means light intensity, nonlinear refractive index, and fiber length in the second single-mode fiber SMF-2, the crosstalk owing to FDM can be compensated.

In this case, the relationship between the zero-dispersion wavelengths $\lambda_{10}$ and $\lambda_{20}$ and the channel disposition is set in the same manner as described earlier.

Figure 10:
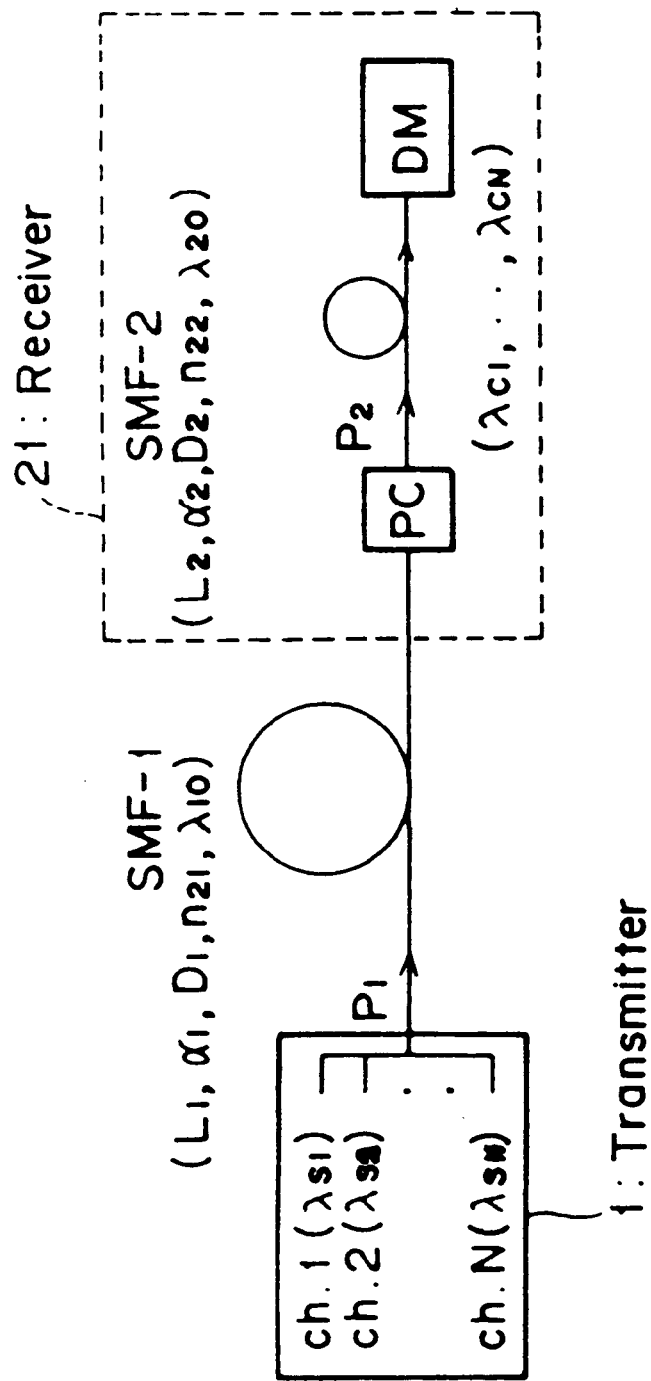
FIG. 10 is a block diagram illustrating the optical communication system practiced as a fourth embodiment of the invention.

Referring to FIG. 10, there is shown a block diagram illustrating the optical communication system practiced as a fourth preferred embodiment of the invention. This embodiment is characterized by that a phase conjugate light generator PC, a second single-mode fiber SMF-2, and a demodulator DM are contained in receiver 21. For an FDM signal light generator, the transmitter 1 of FIG. 5 is used. Therefore, in the fourth embodiment, a first single-mode fiber SMF-1 provides a transmission path. In this embodiment, the influences of GVD and optical Kerr effect can also be compensated by satisfying the equations (32) and (33). Also, satisfying the equations (34) or (35) can compensate the crosstalk owing to FDM. Although this embodiment requires means for excluding polarization dependency in the receiver 21, it is advantageous in that a pump light of the phase conjugate light generator PC provides a capability in the receiver 21 of selecting wavelengths of FDM signal lights.

Figure 11:
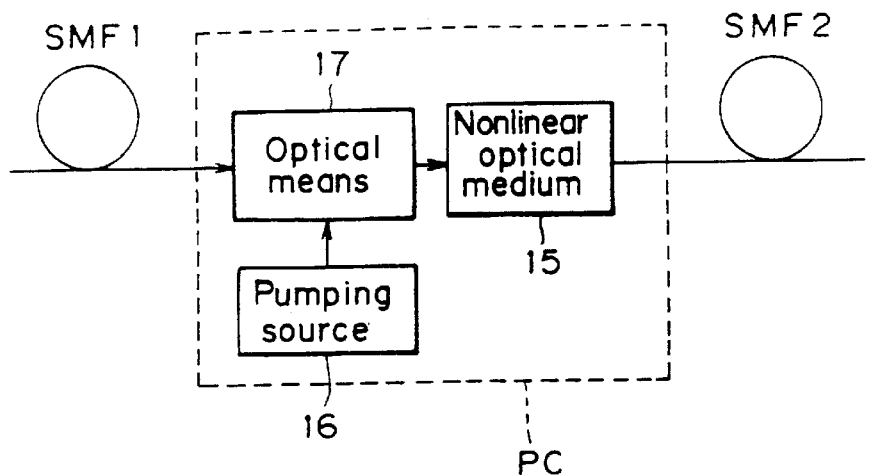
FIG. 11 is a block diagram illustrating a basic constitution of the phase conjugate generator according to the invention.

Referring to FIG. 11, there is shown a basic constitution of the phase conjugate light generator PC. The phase conjugate light generator PC is composed of a nonlinear optical medium 15, a pumping light source 16, and an optical means 17 for supplying an FDM signal light coming from a first single-mode fiber SMF1 to the nonlinear optical medium 15 along with a pump light generated by the pumping light source 16. The nonlinear optical medium provides a second-order or third-order nonlinear optical effect. In the case of the third-order optical effect, a phase conjugate light is generated by a degenerate or non-degenerate four-optical-wave mixing in the nonlinear optical medium 15. Available for a particular nonlinear optical medium is an optical semiconductor such as a semiconductor amplifier of traveling wave type, an organic medium, an optical waveguide using $LiNbO_3$ or the like, or a single-mode fiber. Especially, when using a single-mode fiber, a zero-dispersion wavelength of the single-mode fiber and a wavelength of the pump light are matched to increase a phase conjugate light generating efficiency.

To suppress stimulated Brillouin scattering caused when increasing a pumping power to increase the phase conjugate light generating efficiency, a low-speed frequency modulation is performed on the pump light, for example. Further, to suppress the fluctuation in phase conjugate light generating efficiency caused by the fluctuated polarization state of signal light, a variety of measures against the fluctuation are available. Specific measures will be described later. In what follows, a single-mode fiber is used for the nonlinear optical medium for the convenience of description.

Figure 12:
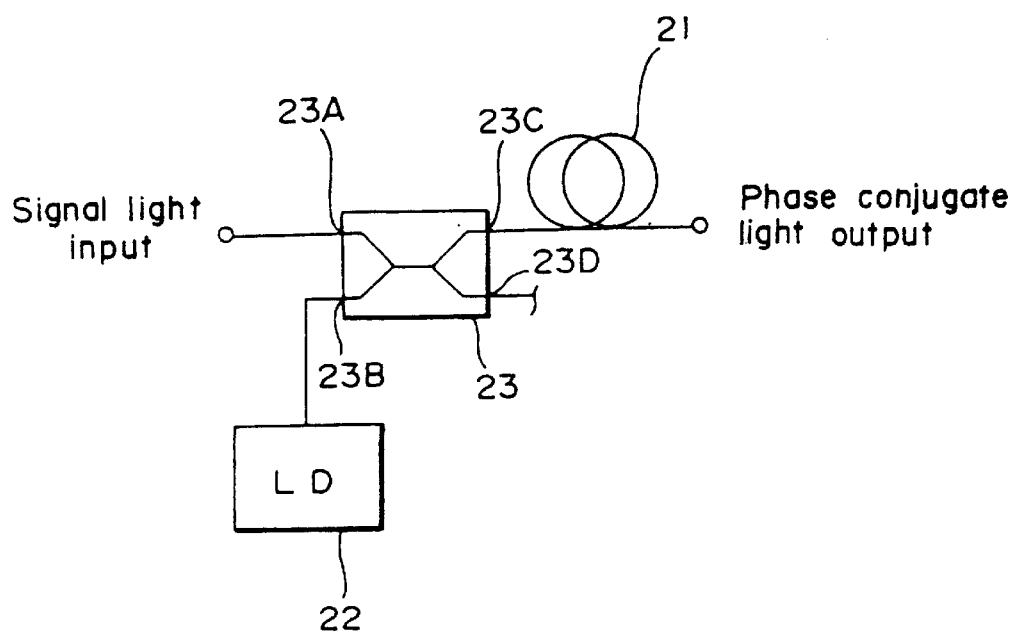
FIG. 12 is a block diagram illustrating the phase conjugate generator practiced as a first embodiment of the invention.

Now, referring to FIG. 12, there is shown a block diagram illustrating a first preferred embodiment of the phase conjugate light generator PC of FIG. 11. This embodiment uses an optical fiber 21, a laser diode 22, and an optical coupler 23 corresponding to the nonlinear optical medium 15, the pumping source 16, and the optical means 17 of FIG. 11 respectively. Preferably, the optical fiber 21 used as the nonlinear optical medium is a single-mode fiber. In this case, to generate the four-wave mixing of non-degenerate type by making signal light wavelength and pump light wavelength slightly different, it is preset so that a wavelength for providing the zero dispersion of the optical fiber 21 matches the wavelength of the pump light (an oscillation wavelength of the laser diode 22).

The optical coupler 23 has four ports 23A, 23B, 23C, and 23D. The port 23A connects to the single-mode fiber SNF1 of FIG. 1, the port 23B connects to the laser diode 22, the port 23C connects to a first end of the optical fiber 21, and the port 23D is dead-ended. A second end of the optical fiber 21 connects to the single-mode fiber SMF2 of FIG. 1. It should be noted that term "connect" denotes an operational connection including direct optical connection, connection via optical devices such as an optical filter, an optical amplifier and an optical isolator, and connection made after appropriately adjusting polarized state.

The optical coupler 23 at least functions such that lights supplied to the ports 23A and 23B is outputted from the port 23C. Available for the optical coupler 23 is an optical coupler of fusion-spliced fiber type, a half mirror, an optical multiplexer, or a polarization beam splitter. According to the constitution of the above-mentioned embodiment, the signal light supplied to the port 23A of the optical coupler 23 and the pump light coming from the laser diode supplied to the port 23B can be guided together into the optical fiber 21, which is the nonlinear optical medium, thereby generating a phase conjugate light of transmission type based on the four-wave mixing.

Figure 13:
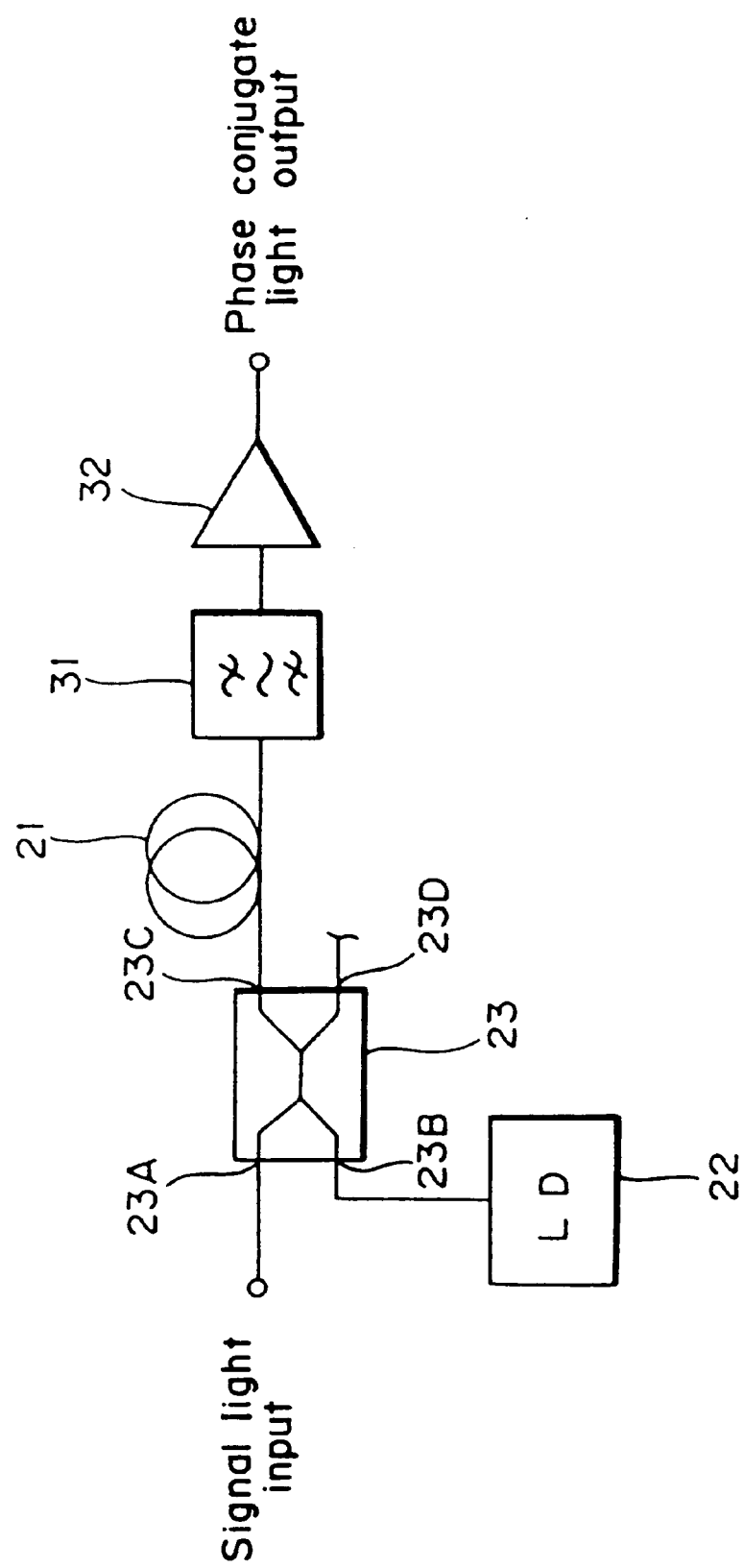
FIG. 13 is a block diagram illustrating the phase conjugate generator practiced as a second embodiment of the invention.

Referring to FIG. 13, there is shown a block diagram illustrating a second preferred embodiment of the phase conjugate light generator PC of FIG. 11. The second embodiment is characterized by that, as compared to the first embodiment of the phase conjugate light generator of FIG. 12, the phase conjugate light generated in the optical fiber 21 is supplied to the second single-mode fiber SMF2 of FIG. 1 via an optical bandpass filter 31 and an optical amplifier in this order. The optical amplifier 32 is a linear optical amplifier for example. A constitution of the optical amplifier 32 includes a doped fiber doped with a rare-earth element such as Er, a pumping source for outputting a pump light, and means for supplying the pump light to the doped fiber along with a light to be amplified.

The optical bandpass filter 31 is for eliminating unwanted lights such as signal light, pump light, and noise light. Elimination of these unwanted lights permits to prevent the operation of the light amplifier 32 being saturated by the pump light coming from the laser diode 22, for example. At the same time, the elimination of the unwanted light permits to sufficiently amplify the phase conjugate light generated in the optical fiber 21. Generally, the intensity of a pump light for generating a phase conjugate light is far higher than the intensity of a signal light and the intensity of a phase conjugate light, so that the elimination of unwanted lights such as the pump light by means of the optical bandpass filter 31 prevents the high-intensity pump light from causing a further nonlinear optical effect in a subsequent optical path. Further, the elimination of unwanted lights by means of the optical bandpass filter 31 can exclude the difficulty in demodulation due to the presence of a pump light when reproducing a demodulated signal based on a phase conjugate light.

To efficiently generate a phase conjugate light inside a nonlinear optical medium, an optical amplifier and an optical bandpass filter may be inserted in this order between the single-mode fiber SMF1 of FIG. 1 and the port 23A of the optical coupler 23. It should be noted that, if the intensity of the pump light supplied from the laser diode 22 is sufficiently high, the intensity of the phase conjugate light to be generated in the optical fiber 21 may exceed the intensity of the signal light supplied to the optical fiber 21. If such an amplifying operation is taking place, the optical amplifier 32 need not be used.

Figure 14:
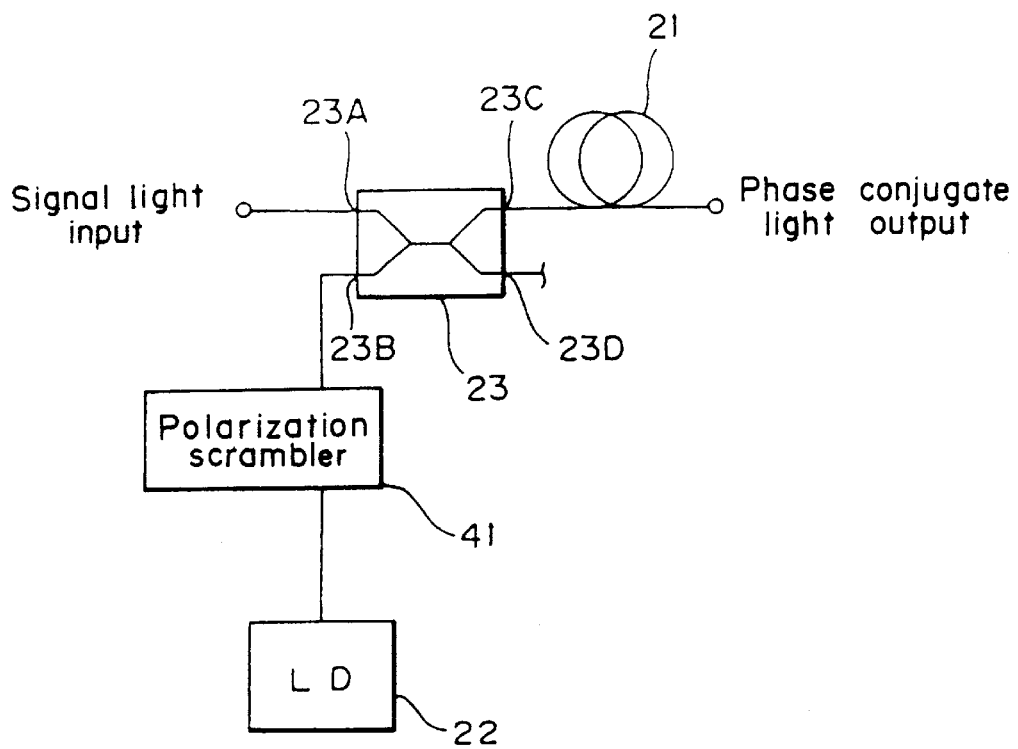
FIG. 14 is a block diagram illustrating the phase conjugate generator practiced as a third embodiment of the invention.

Referring to FIG. 14, there is shown a block diagram of a third preferred embodiment of the phase conjugate light generator PC. As compared to the first embodiment of FIG. 12, the third embodiment is characterized by a polarization scrambler 41 provided between the laser diode 22 functioning as the pumping source and the port 23B of the optical coupler 23.

Generally, the single-mode fiber transmission mode has two polarization modes of which planes of polarization orthogonally cross each other. These two polarization modes are coupled by a variety of external disturbances and, as a result, the polarization state of the light to be supplied to the first end of the optical fiber does not match the polarization state of the light to be outputted from the second end of the optical fiber. Consequently, if a single-mode fiber is used for the light transmission path of FIG. 1, the state of the signal light to be supplied to the phase conjugate light generator PC fluctuates over time by an environmental change or the like. On the other hand, as is apparent from the principle of the generation of phase conjugate described above, the efficiency of conversion from signal light to phase conjugate light in the phase conjugate light generator of FIG. 1 depends on the relationship between the polarization state of the signal light to be supplied to the phase conjugate light generator PC and the polarization state of the pump light.

According to the third embodiment of the phase conjugate light generator of FIG. 14, the pump light coming from the laser diode 22 is made confluent with the signal light via the polarization scrambler 41, so that, if the polarization state of the signal light fluctuates over time, the stable operation of the phase conjugate light generator can be ensured by making constant the efficiency of conversion from signal light to phase conjugate light.

The polarization scrambler 41 is ordinarily composed of a ½ wavelength plate and a ¼ wavelength plate for relatively slow fluctuation of polarization. For example, if the pump light supplied from the laser diode 22 is a generally linearly polarized light, the polarization scrambler operates such that it rotates the plane of polarization of the pump light. Presetting the operating frequency (for example, a reciprocal of a rotational frequency of the polarization plane) of the polarization scrambler 41 to faster than a bit-rate of the transmitting signal permits to sufficiently exclude the above-mentioned polarization dependency. For relatively fast fluctuation of polarization, a phase modulator driven with high speed signal can be used as the polarization scrambler. In this example, the polarization scrambler is operated on the pump light supplied from the laser diode 22. It will be apparent that the polarization scrambler may be operated on the signal light. It will also be apparent that the polarization scrambler may be operated on both the pump light and the signal light.

Figure 15:
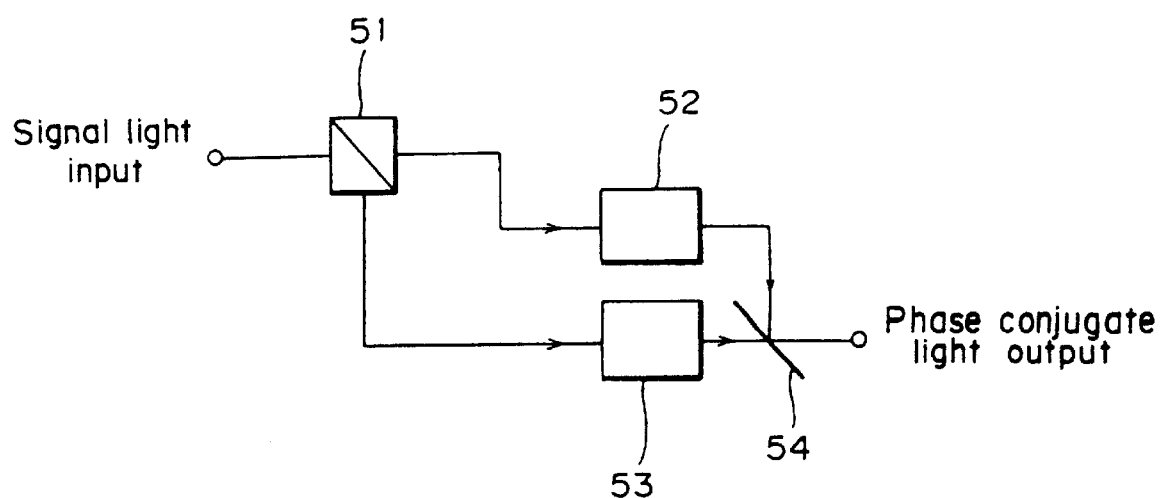
FIG. 15 is a block diagram illustrating the phase conjugate generator practiced as a fourth embodiment of the invention.

Referring to FIG. 15, there is shown a block diagram illustrating a fourth preferred embodiment of the phase conjugate light generator PC of FIG. 11. The fourth embodiment includes a polarization beam splitter 51 for splitting a signal light supplied from the first single-mode fiber SMF1 of FIG. 1 into first and second polarization components of which polarization planes orthogonally cross each other, phase conjugate light generators 52 and 53 for generating phase conjugate lights based on the first and second polarization components coming from the polarization beam splitter 51, and a polarization composer 54 for making confluent the phase conjugate lights coming from the phase conjugate light generators 52 and 53. Available for the polarization composer 54 is a polarization beam splitter for example. A phase conjugate light composed by the polarization composer 54 is supplied to the second single-mode fiber SMF2 of FIG. 1. For the phase conjugate light generators 52 and 53, the constitution of FIG. 12 is employed for example.

According to the above-mentioned fourth embodiment, the first and second polarization components of the signal lights to be supplied to the phase conjugate light generators 52 and 53 are both linearly polarized lights, so that, in the phase conjugate light generators 52 and 53, it is easy to match the polarization state of the supplied signal light (the first or second polarization component) with the polarization state of the pump light, thereby implementing phase conjugate light generating means having no polarization dependency. Namely, regardless of the fluctuation of the polarization state of the signal light supplied from the single-mode fiber SMF1 of FIG. 1, the fourth embodiment can supply the phase conjugate light of a constant intensity to the single-mode fiber SMF2.

Figure 16:
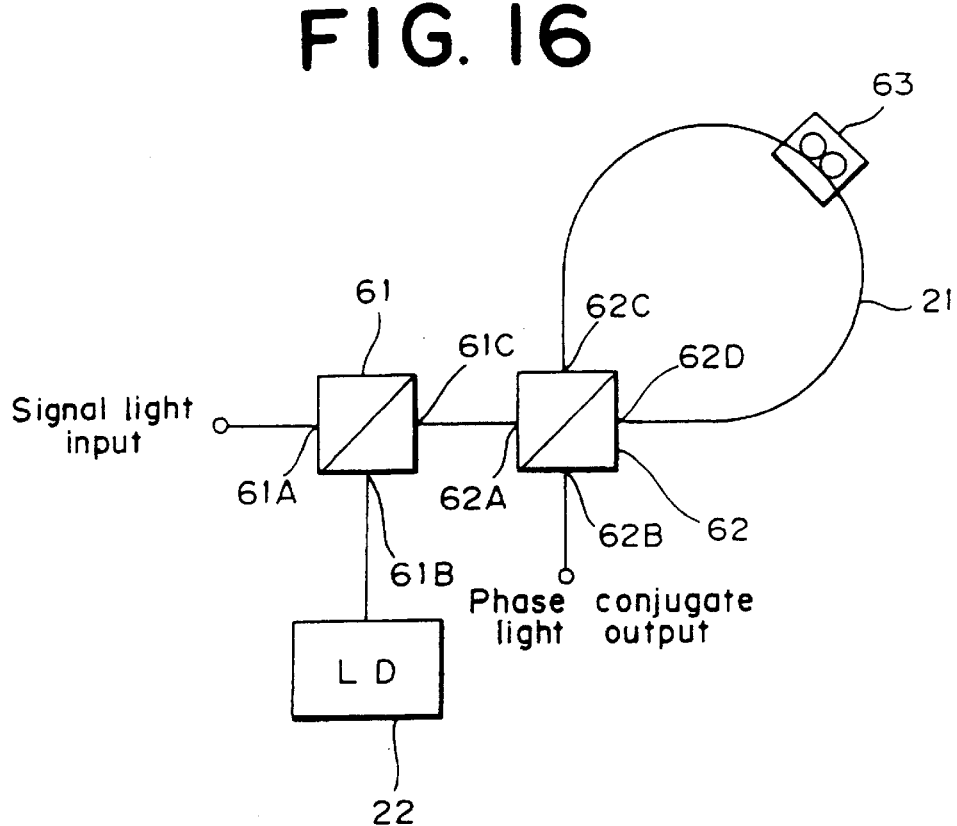
FIG. 16 is a block diagram illustrating the phase conjugate generator practiced as a fifth embodiment of the invention.

Referring to FIG. 16, there is shown a block diagram of a fifth preferred embodiment of the phase conjugate light generator PC of FIG. 11. The fifth embodiment is the same as the first through fourth embodiments in that the laser diode 22 is used as the pumping source 16 and the optical fiber 21 is used as the nonlinear optical medium 15. In the fifth embodiment, the optical means 17 of FIG. 11 includes an optical coupler 61 and a polarization beam splitter 62 to bidirectionally guide a signal light and a pump light into the optical fiber 21, or the nonlinear optical medium.

The optical coupler 61 has ports 61A, 61B, and 61C and outputs, from the port 61C, lights supplied at the ports 61A and 61B. The port 61A is connected with the single-mode fiber SMF1 of FIG. 1 and the port 61B is connected with the laser diode 22 as the pumping source. The polarization beam splitter 62 has ports 62A, 62B, 62C, and 62D and splits lights supplied to the ports 62A and 62B into two orthogonal polarization components. These components are outputted from the port 62A and 62B. The port 62A is connected with the port 61C of the optical coupler 61, the port 62B is connected with the single-mode fiber SMF2 of FIG. 1, and between the ports 62C and 62D is connected the optical fiber 21. A polarization controller 63 is provided midway on the optical fiber 21, the controller 63 being ordinarily constituted with a ¼ wavelength plate and a ½ wavelength plate. The controller 63 performs control such that the polarization state of a light supplied to the optical fiber 21 matches the polarization state of a light to be outputted from the optical fiber 21 (90°-rotation).

The supplied signal light is joined with the pump light coming from the laser diode 22 in the coupler 61. These signal light and pump light are split by the polarization splitter 62 into a first polarization component and a second polarization component of which polarization plane orthogonally crosses a polarization plane of the first polarization component. The first and second polarization components are transmitted over the optical fiber 21 in the opposite directions and polarization-composed when passing the polarization beam splitter 62 again to be outputted from the port 62B.

The polarization plane of the pump light outputted from the laser diode 22 is set such that a distribution ratio of the pump light from the laser diode 22 to the first and second polarization components generated by splitting in the polarization beam splitter 62 becomes 1:1. That is, the laser diode is set such that the polarization plane of the pump light to be supplied to the port 62A of the polarization beam splitter 62 tilts about 45 degrees against the polarization planes of the first and second polarization components. This setting allows the orthogonally crossing two polarization components of the pump light to act on the orthogonally crossing two polarization components of the signal lights guided in the optical fiber 21 in opposite directions, on each matching polarization plane. As a result, when the phase conjugate lights generated in the optical fiber in the opposite directions are composed in the polarization beam splitter 62 to be outputted from the port 62B, the phase conjugate light having a constant intensity can be obtained regardless of the fluctuation in the polarization state of the supplied signal light.

Figure 17:
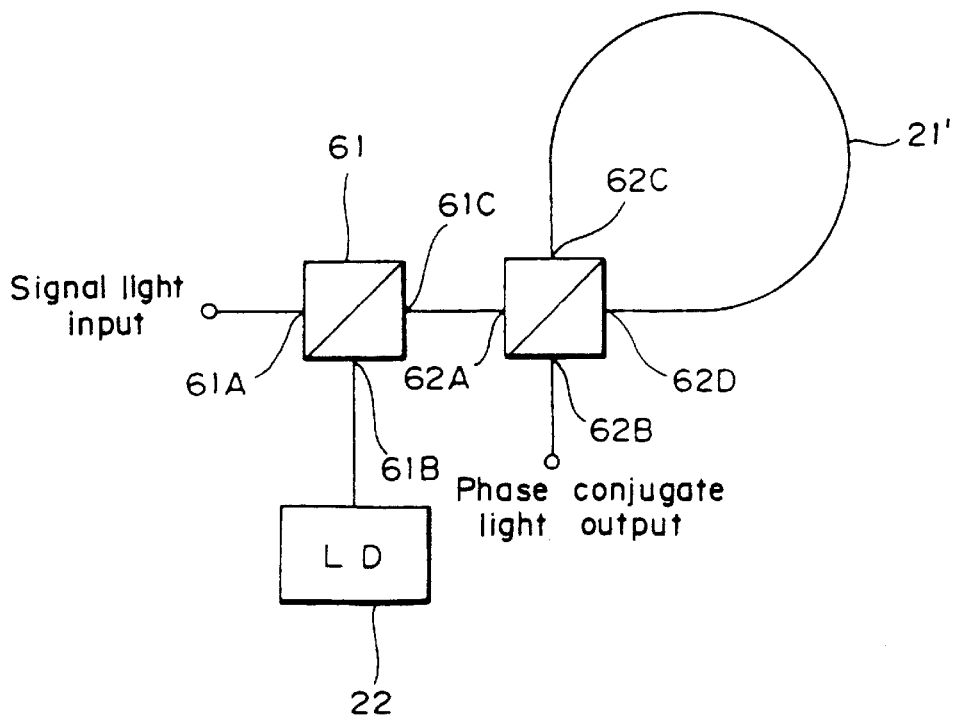
FIG. 17 is a block diagram illustrating the phase conjugate generator practiced as a sixth embodiment of the invention.

Referring to FIG. 17, there is a block diagram illustrating a sixth embodiment of the phase conjugate light generator PC of FIG. 11. As compared to the fifth embodiment of the phase conjugate light generator of FIG. 16, the sixth embodiment is characterized by the use of a polarization maintaining fiber (PMF) 21' of polarization plane preserving type for the optical fiber 21. The PMF 21' is connected to the polarization beam splitter 62 such that the polarization state of a light supplied to the PMF 21' matches the polarization axis of a light to be outputted from the PMF 21'. In this case, the main axis of the PMF 21' is parallel to a polarization plane of a linearly polarized light to be polarization-split by the polarization beam splitter 62. According to the sixth embodiment, the polarization controller 63 of FIG. 16 is not required, resulting in a relatively simple constitution.

Figure 18:
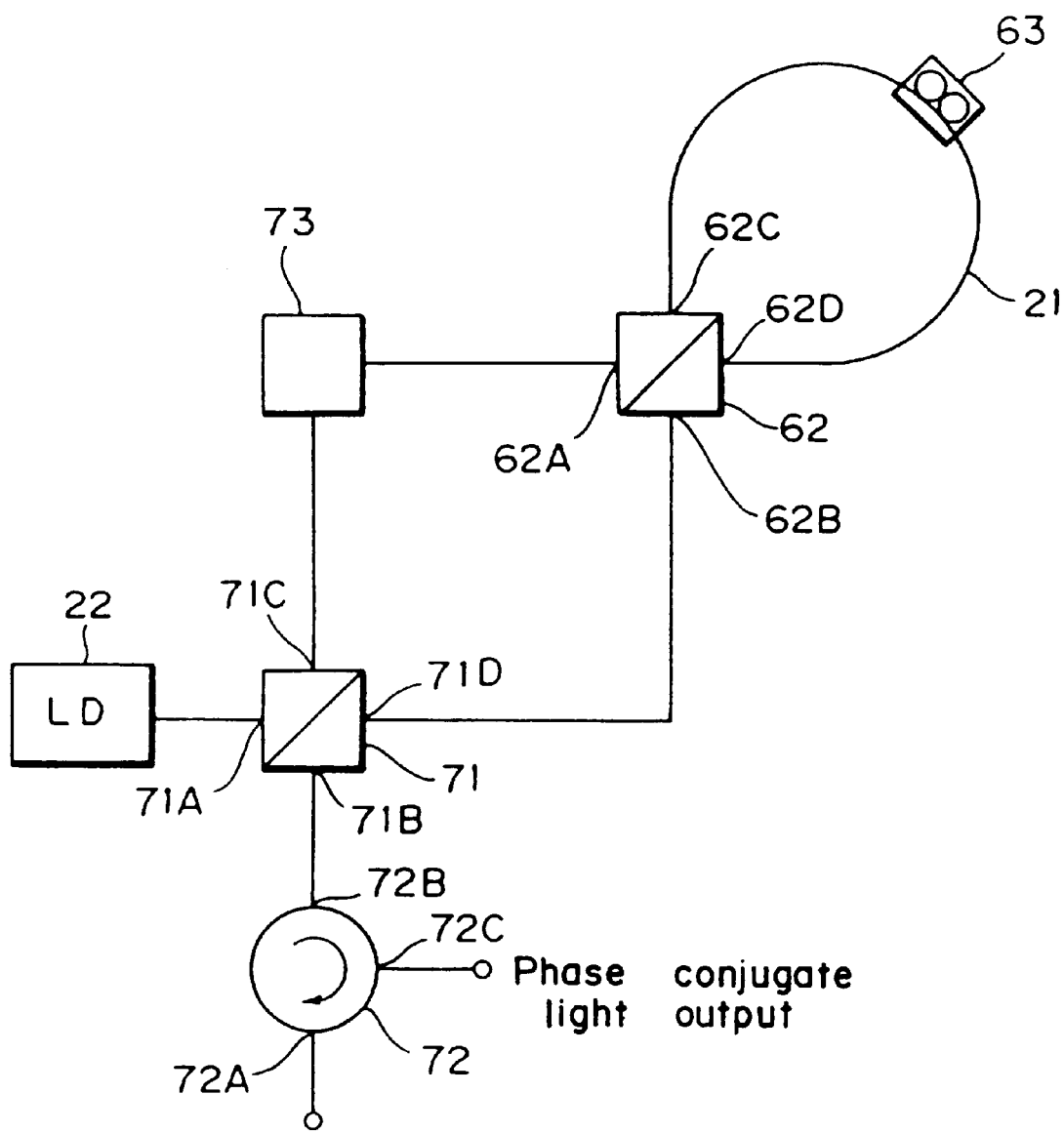
FIG. 18 is a block diagram illustrating the phase conjugate generator practiced as a seventh embodiment of the invention.

Referring to FIG. 18, there is shown a block diagram illustrating a seventh preferred embodiment of the phase conjugate light generator PC of FIG. 11. The seventh embodiment is the same as the fifth embodiment of FIG. 16 in use of the optical fiber 21 as a nonlinear optical medium, the laser diode 22 as a pumping source, the polarization beam splitter 62, and the polarization controller 63. In the seventh embodiment, the optical means 17 of FIG. 11 includes an optical coupler 71, a ½ wavelength plate 73, and the polarization beam splitter 62 to separate a pump light left unconsumed in generation of a phase conjugate light from the phase conjugate light. The optical means 17 also includes an optical circulator 72 to separate the port for supplying the pump light from the port for tapping the phase conjugate light.

The optical circulator 72 has three ports 72A, 72B, and 72C. A light supplied at the port 72A is outputted at the port 72B. A light supplied at the port 72B is outputted at the port 72C. A light supplied at the port 72C is outputted at the port 72A. The port 72A is connected with the single-mode fiber SMF1 of FIG. 1. The port 72C is connected to the single-mode fiber SMF2.

The optical coupler 71 has four ports 71A, 71B, 71C, and 71D. The lights supplied to the ports 71A and 71B are equally distributed to be outputted from the ports 71C and 71D. The lights supplied to the ports 71C and 71D are equally distributed to be outputted from the ports 71A and 71B. For the optical coupler 71, a half mirror type or a fusion-spliced type is used.

The port 71A of the optical coupler 71 is connected with the laser diode 22 as the pumping source, the port 71B is connected with the port 72B of the optical circulator 72, the port 71D is connected with the port 62B of the polarization beam splitter 62. The ½ wavelength plate 73 is provided in an optical path between the port 71C of the optical coupler 71 and the port 62A of the polarization beam splitter 62 to rotate the polarization plane of the supplied light by 90 degrees. The seventh embodiment is adapted such that the polarization state of the pump light to be supplied to the port 71A of the optical coupler 71 matches the polarization state of the signal light to be supplied to the port 71B of the optical coupler 71 from the laser diode 22 via the optical circulator 72. The following describes the operation of the seventh embodiment on the supposition that these pump light and signal light are linearly polarized lights having polarization planes perpendicular to a paper surface.

The pump light and the signal light respectively supplied to the port 71a and the port 71B of the optical coupler 71 are equally distributed to be outputted from the port 71C and the port 71D. The signal light and the pump light outputted from the port 71C are rotated by the ½ wavelength plate 73 by 90 degrees to be supplied to the port 62A of the polarization beam splitter 62 as a linearly polarized light having a polarization plane parallel to the paper surface. The signal light and the pump light supplied to the port 62A are then supplied from the port 62D to the optical fiber 21. When these lights are transmitted in the optical fiber 21 counterclockwise, a phase conjugate light is generated in the same direction. The phase conjugate light and the remaining pump light are fed from the port 62C to the polarization beam splitter 62 and outputted from the port 62B. On the other hand, the signal light and the pump light supplied from the port 71D of the optical coupler 71 to the port 62B of the polarization beam splitter 62 have polarization planes perpendicular to the paper surface, so that these lights are supplied from the port 62D to the optical fiber 21. When these lights are transmitted in the optical fiber 21 counterclockwise, a phase conjugate light is generated.

This phase conjugate light and the remaining pump light are supplied from port 62C to the polarization beam splitter 62 to be outputted from the port 62A. The phase conjugate light and the pump light supplied from the port 62C to the ½ wavelength plate 73 are rotated by 90 degrees in their polarization planes to be supplied to the port 71C of the optical coupler 71 as linearly polarized lights parallel to the paper surface.

The pump light and the phase conjugate light supplied from the ½ wavelength plate to the port 71C and the pump light and the phase conjugate light supplied from the port 62B of the polarization beam splitter 62 to the port 71D of the optical coupler 71 all have polarization planes parallel to the paper surface. And lengths of the optical paths through which these lights have passed completely match each other. Therefore, in the optical coupler 71, of the pump light and the phase conjugate light supplied to the port 71C and the port 71D, the pump light is mainly outputted from the port 71A while the phase conjugate light is mainly outputted from the port 71B. The light outputted from the port 71B of the optical coupler 71 is supplied to the single-mode fiber SMF2 of FIG. 1 via the optical circulator 72.

According to the seventh embodiment of the invention, the pump light remaining in generation of the phase conjugate light can be separated from the generated phase conjugate light without using an optical filter (for example, the optical bandpass filter 31 of FIG. 13). The intensity of the pump light used to generate the phase conjugate light is extremely high as compared with the intensities of the signal light and the generated phase conjugate light, so that the embodiment of FIG. 18 is effective in separating the pump light having such a high intensity from the phase conjugate light.

Figure 19:
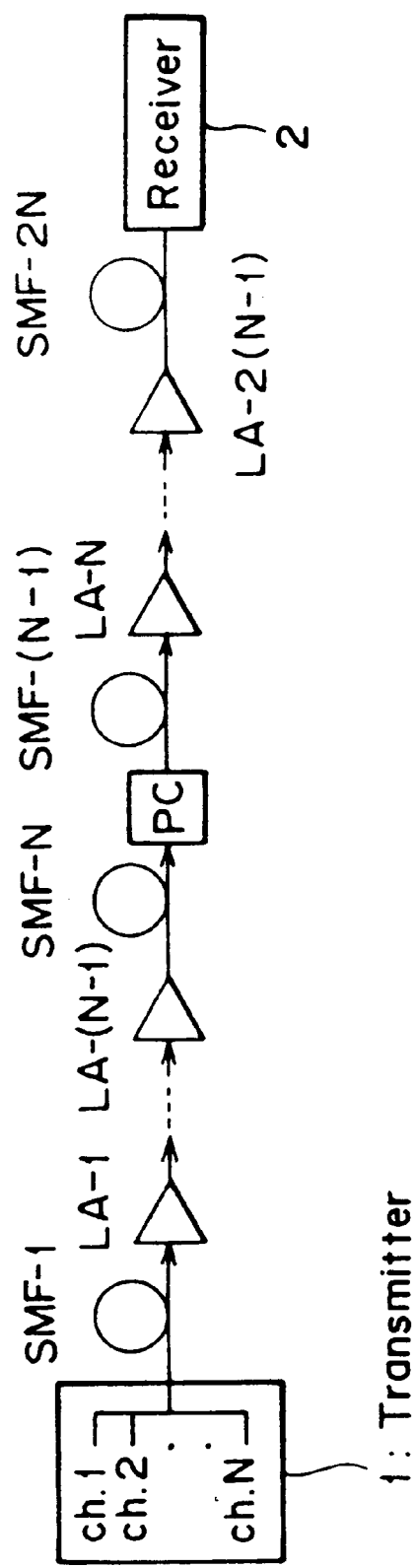
FIG. 19 is a diagram illustrating the optical communication system practiced as a fifth embodiment of the invention.

Referring to FIG. 19, there is shown a diagram illustrating the optical communication system practiced as a fifth preferred embodiment of the invention. Halfway on an optical transmission path between a transmitter 1 and a receiver 2, a phase conjugate generator PC is disposed. Between the transmitter 1 and the phase conjugate light generator PC, (N−11) optical amplifiers LA-1, 2, . . . , (N−1) are disposed. Between the phase conjugate light generator PC and the receiver 2, (N−1) optical amplifiers LA-N, . . . , 2 (N−1) are disposed. The transmission path between the transmitter 1 and the phase conjugate light generator PC is composed of N single-mode fibers SMF-1, . . . , N. The optical transmission path between the phase conjugate light generator PC and the receiver 2 is also composed of N single-mode fibers SMF-(N+1), . . . , 2N. The arrangements of the single-mode fibers and optical amplifiers between the transmitter 1 and the phase conjugate light generator PC are symmetrical with those of the single-mode fibers and optical amplifiers between the phase conjugate light generator PC and the receiver 2.

According to the embodiment of FIG. 19, a crosstalk light generated in each single-mode fiber between the transmitter 1 and the phase conjugate light generator PC can be compensated by a crosstalk light generated in each single-mode fiber between the phase conjugate light generator PC and the receiver 2 based on the principle of the present invention. In this case, let a length of each single-mode fiber be L and a mean optical power in each He single-mode fiber be P, then an efficient crosstalk compensation can be obtained by satisfying the following condition:

$$\frac{2\kappa}{\varepsilon_0 n c A_{eff}} PL < 0.17\,\pi \tag{36}$$

where, $\varepsilon_0$ represents a vacuum dielectric constant, n represents a refractive index of single-mode fiber core, and $A_{eff}$ represents an effective core cross section of single-mode fiber. Thus, the present invention is also applicable to optical amplification repeating system.

As described and according to the invention, there are provided the optical communication system and the optical commutation method substantially free from the influence of channel-to-channel crosstalk.

While the preferred embodiments of the present invention have been described using specific terms, such description is for illustrative purposes only, and it is to be understood that changes and variations may be made without departing from the spirit or scope of the appended claims.

What is claimed is:

1. An optical communication method for a frequency division multiplexed signal light comprising the steps of:
   receiving said frequency division multiplexed signal light through a first optical fiber;
   generating a frequency division multiplexed phase conjugate light corresponding to said frequency division multiplexed signal light; and
   transmitting said frequency division multiplexed phase conjugate light to a second optical fiber;
   wherein a product of a mean light intensity, a nonlinear refractive index, and a length of said first optical fiber is substantially equal to a product of a mean light intensity, a nonlinear refractive index, and a length of said second optical fiber.

2. An optical communication system for a frequency division multiplexed signal light comprising:
   a first optical fiber having a first end and a second end, said first end receiving said frequency division multiplexed signal light;
   phase conjugate light generating means having an input end and an output end, said input end being connected to said second end of said first optical fiber to generate a frequency division multiplexed phase conjugate light corresponding to said frequency division multiplexed signal light entered at said input end;

and a second optical fiber having a first end and a second end, said first end being connected to said output end of said phase conjugate light generating means, said frequency division multiplexed phase conjugate light entered at said first end being transmitted to said second end to be outputted;

wherein a product of a mean light intensity, a nonlinear refractive index, and a length of said first optical fiber is substantially equal to a product of a mean light intensity, a nonlinear refractive index, and a length of said second optical fiber.

3. An optical communication system as defined in claim 2 further comprising:

demodulating means for demodulating said frequency division multiplexed phase conjugate light outputted from said second end, said demodulating means being connected to said second end of said second optical fiber.

4. An optical communication system as defined in claim 2, wherein said phase conjugate light generating means comprising a nonlinear optical medium, a pumping source for generating a pump light, and optical means for supplying said pump light and said frequency division multiplexed signal light to said nonlinear optical medium.

5. An optical communication system as defined in claim 4, wherein said nonlinear optical medium provides a third-order nonlinear optical effect and, in said nonlinear optical medium, said frequency division multiplexed signal light is converted to said frequency division multiplexed conjugate light by four-wave mixing.

6. An optical communication system as defined in claim 5, wherein said nonlinear optical medium is composed of an optical fiber and a zero dispersion wavelength of said optical fiber generally matches a wavelength of said pump light.

7. An optical communication system as defined in claim 2, wherein a relative relationship between a wavelength allocation of light carriers of said frequency division multiplexed signal light and a zero dispersion wavelength of said first single-mode fiber is generally symmetrical with a relative relationship between a wavelength allocation of light carriers of said frequency division multiplexed conjugate light and a zero dispersion wavelength of said second single-mode fiber.

8. An optical communication system as defined in claim 7, wherein said first and second optical fibers have different signs of second-order dispersion.

9. An optical communication system as defined in claim 2, wherein an allocation of wavelength positions of light carriers of said frequency division multiplexed signal light observed from a zero dispersion wavelength of said first single-mode fiber generally matches with an allocation of wavelength positions of light carriers of said frequency division multiplexed conjugate light observed from a zero dispersion wavelength of said second single-mode fiber.

10. An optical communication system as defined in claim 2 further comprising at least one optical path including elements corresponding to said first optical fiber, said phase conjugate light generating means, and said second optical fiber, said optical path being connected to said second optical fiber in series downstream thereof.

11. An optical communication system as defined in claim 10, wherein said optical path further includes an optical amplifier.

12. An optical communication system as defined in claim 2, wherein said frequency division multiplexed signal light generating means, said first optical fiber, and said phase conjugate light generating means are included in an optical transmitter.

13. An optical communication system as defined in claim 2, wherein said phase conjugate light generating means and said second optical fiber are included in an optical receiver.

14. An optical communication system as defined in claim 2 further comprising a polarization scrambler operated on said frequency division multiplexed signal light.

15. An optical communication system as defined in claim 4 further comprising a polarization scrambler operated on said pump light.

16. An optical communication system as defined in claim 2 further comprising an optical amplifier provided on each of said first optical fiber and said second optical fiber halfway thereof.

17. An optical communication system as defined in claim 2, wherein said first and second optical fibers have dispersions not depending on wavelength of light.

18. An optical communication device for frequency division multiplexed signal light transmitting to first and second optical fiber, comprising:

phase conjugate light generator having an input end and an output end, said input end receiving the frequency division multiplexed light through said first optical fiber to generate a frequency division multiplexed phase conjugate light corresponding to said frequency division multiplexed signal light, said output end transmitting said frequency division multiplexed phase conjugate light to said second optical fiber;

wherein a product of a mean light intensity, a nonlinear refractive index, and a length of said first optical fiber is substantially equal to a product of a mean light intensity, a nonlinear refractive index, and a length of said second optical fiber.

* * * * *

UNITED STATES PATENT AND TRADEMARK OFFICE
CERTIFICATE OF CORRECTION

PATENT NO.   : 6,304,348 B1
DATED        : October 16, 2001
INVENTOR(S)  : Shigeki Watanabe It is certified that error appears in the above-identified patent and that said Letters Patent is hereby corrected as shown below:

<u>Title page,</u>
Item [56], References Cited, please insert

-- 5,386,314   1/1995   Jopson. -- and
-- 5,400,164   3/1995   Kurtzke et al. --.

Note: These references were cited in the IDS filed 1/7/98 and were omitted from the Patent.

Signed and Sealed this

Nineteenth Day of March, 2002

Attest:

JAMES E. ROGAN
*Director of the United States Patent and Trademark Office*

*Attesting Officer*